United States Patent
Deighton et al.

(10) Patent No.: US 11,267,406 B2
(45) Date of Patent: Mar. 8, 2022

(54) TRUCK MOUNTING SYSTEM WITH TWO PIVOTAL A-ARMS

(71) Applicant: Pelican Products, Inc., Torrance, CA (US)

(72) Inventors: Kevin John Deighton, Redondo Beach, CA (US); Scott Lee Bossenbroek, Cerritos, CA (US); Robert Clifford Tennant, Hermosa Beach, CA (US)

(73) Assignee: Pelican Products, Inc., Torrance, CA (US)

( * ) Notice: Subject to any disclaimer, the term of this patent is extended or adjusted under 35 U.S.C. 154(b) by 0 days.

(21) Appl. No.: 16/742,830

(22) Filed: Jan. 14, 2020

(65) Prior Publication Data

US 2021/0213887 A1  Jul. 15, 2021

(51) Int. Cl.
*B60R 9/06* (2006.01)
*B62D 33/02* (2006.01)

(52) U.S. Cl.
CPC ............ *B60R 9/06* (2013.01); *B62D 33/0207* (2013.01)

(58) Field of Classification Search
USPC ........................................................ 224/403
See application file for complete search history.

(56) References Cited

U.S. PATENT DOCUMENTS

| | | | | |
|---|---|---|---|---|
| 4,013,203 A | * | 3/1977 | McCauley | B62D 43/02 224/42.24 |
| 4,212,417 A | * | 7/1980 | Scott | B62D 43/08 224/403 |
| 4,518,189 A | | 5/1985 | Belt | |
| 4,728,017 A | * | 3/1988 | Mullican | B60R 9/00 224/328 |
| 5,642,845 A | * | 7/1997 | Van Kooten | B60R 11/06 224/403 |
| 5,964,492 A | * | 10/1999 | Lyon | B60R 9/00 224/404 |
| 6,000,740 A | * | 12/1999 | Hall | B60P 7/04 296/37.6 |
| 6,039,520 A | * | 3/2000 | Cheng | B60P 7/0807 410/106 |
| 6,082,804 A | * | 7/2000 | Schlachter | B60R 9/00 224/281 |

(Continued)

FOREIGN PATENT DOCUMENTS

JP      2004-161084 A     6/2004

OTHER PUBLICATIONS

Extended European Search Report dated Jun. 2, 2021, from application No. 20214523.1.

(Continued)

*Primary Examiner* — Peter N Helvey
(74) *Attorney, Agent, or Firm* — Foley & Lardner LLP

(57) ABSTRACT

A mounting system for securing a container to a bed of a vehicle or other installation location includes a sidewall mounting bracket for mounting to a first sidewall of the bed. An arm body has a length dimension that is adjustable. A first joint pivotally attaches a first end of the arm body to the sidewall mounting bracket for pivotal movement relative to the first sidewall of the bed when the sidewall mounting bracket is mounted to the first sidewall of the bed. A second joint for attaching a second end of the arm body to the container.

19 Claims, 14 Drawing Sheets

(56) References Cited

U.S. PATENT DOCUMENTS

| | | | | |
|---|---|---|---|---|
| 6,412,847 | B2* | 7/2002 | De Gaillard | B62D 33/0276 296/100.09 |
| 6,547,314 | B1* | 4/2003 | Rasmussen | B60P 3/36 296/167 |
| 6,629,807 | B2* | 10/2003 | Bernardo | B60P 7/14 410/118 |
| 6,923,354 | B2* | 8/2005 | Axelson | B60R 9/00 224/281 |
| 8,118,202 | B1* | 2/2012 | Price | B60P 7/0807 224/403 |
| 8,281,967 | B2* | 10/2012 | Evans | B60R 9/00 224/404 |
| D702,620 | S* | 4/2014 | Read | D12/223 |
| 9,925,909 | B2* | 3/2018 | Byham | B60P 3/055 |
| 9,937,869 | B2* | 4/2018 | Hemphill | B60P 7/08 |
| 10,343,587 | B2* | 7/2019 | Frazier | B60P 7/0807 |
| 10,464,466 | B2* | 11/2019 | Line | B60P 7/08 |
| 10,513,227 | B2* | 12/2019 | Merino | B60R 9/10 |
| 2004/0047703 | A1 | 3/2004 | Bernardo | |
| 2004/0207226 | A1 | 10/2004 | Johnson | |
| 2005/0168011 | A1* | 8/2005 | Rasmussen | B60P 7/08 296/167 |
| 2005/0191118 | A1* | 9/2005 | Kay | F16B 7/06 403/48 |
| 2010/0148536 | A1 | 6/2010 | Snyder | |
| 2011/0204110 | A1* | 8/2011 | Read | B60R 9/065 224/560 |
| 2012/0161470 | A1 | 6/2012 | Castillo | |
| 2012/0200106 | A1 | 8/2012 | Villano et al. | |
| 2014/0054339 | A1 | 2/2014 | Smith | |
| 2017/0043699 | A1 | 2/2017 | Gordon | |
| 2017/0120837 | A1 | 5/2017 | Garrison et al. | |
| 2018/0272915 | A1 | 9/2018 | Young | |
| 2020/0198543 | A1* | 6/2020 | Pokriefka | B62D 33/027 |

OTHER PUBLICATIONS

Australian Examination Report dated Jan. 6, 2021, from application No. 2020201887.

* cited by examiner

TRUCK MOUNTING SYSTEM WITH TWO PIVOTAL A-ARMS

BACKGROUND

The present disclosure relates generally to mounting systems for mounting cases or trunks (or other objects) to a bed of a truck or other vehicle, and to processes of making and using such systems. Various types of vehicles, such as, but not limited to pickup trucks, panel trucks, or other types of trucks, train cars, ships and planes typically have a cargo bed, deck or other surface for carrying cargo (which may include one or more cases, trunks or other containers, or the like).

Containers, trunks or cases as described herein may include any suitable rigid structure having an outer shell surrounding a hollow or partially hollow interior volume for holding or containing one or more objects, items, goods, fragile or breakable articles, tools, equipment, live cargo, biological cargo, other cargo or the like. In particular examples, containers, trunks or cases as described herein are configured to be taken to or from a vehicle, and to be selectively mounted to a bed, deck or other surface of a vehicle to be carried on and transported by the vehicle between geographic locations. Different types and sizes of container structures may be used for different types of cargo, or for different contexts or applications of use.

When placed on a bed or deck of a vehicle, containers, trunks or cases can tend to slide, bump and collide with each other or the wall of the vehicle bed, as the vehicle moves. Various straps or racks have been developed, to help hold containers, trunks, cases or other cargo in place and inhibit them from moving within the vehicle bed, during transportation. In addition, cargo boxes and tool boxes have been mounted to sidewalls and beds of pickup trucks in permanent or semi-permanent manners, where the cargo or tool boxes are intended to remain fixed to the bed of the vehicle. However, such conventional configurations typically do not provide a user-friendly system that not only securely mounts containers, trunks or cases to a bed of a vehicle, but also allows the containers to be easily placed on or removed from the vehicle bed, is sufficiently rugged and durable to withstand multiple sequences of mounting and removing the container, trunk or case, and can readily mount to one or more types of vehicle beds.

SUMMARY

Example embodiments described herein relate to mounting systems for mounting cases or trunks (or other objects) to a bed of a truck or other vehicle, and to processes of making and using such systems.

According to an example embodiment, a mounting system for securing a container to a bed of a vehicle or other installation location includes a first arm configured to couple a first side of the container to a first sidewall of the bed. A second arm is configured to couple a second side of the container to a second sidewall of the bed, where the second sidewall of the bed faces the first sidewall of the bed. Each of the arms includes an arm body having a length dimension, where the arm body of at least one of the arms is adjustable in the length dimension. A first joint for pivotally attaching a first end of the arm body for pivotal movement relative to one of the first or the second sidewall of the bed. A second joint for attaching a second end of the arm body for pivotal movement relative to another one of the first or the second sidewall of the container. Each arm is pivotally moveable relative to a respective one of a first and second sidewalls of the bed when the arm is attached to the respective one of the first sidewall and the second sidewall of the bed through the first joint and is not attached to the container at the second joint. In addition, the arm body of each arm is adjustable in its length dimension to a length that inhibits pivotal motion of each arm when the first end of each arm is pivotally attached relative to a respective one of the first sidewall and the second sidewall of the bed at the first joint and the second end of each arm is attached to the container at the second joint.

A mounting system according to a further example includes the container, a first container bracket on a first side of the container, and a second container bracket on a second side of the container. At least one connector is for selectively connecting the first container bracket to the first arm.

A mounting system according to a further example includes a second connector for selectively connecting the second container bracket to the second arm.

A mounting system according to a further example includes the container, a first container bracket on a first side of the container, and a second container bracket on a second side of the container, where the second joint of the first arm is configured to couple to the first container bracket, and where the second joint of the second arm is configured to couple to the second container bracket.

In a mounting system according to a further example, the second joint of the first arm is configured to pivotally couple to the first container bracket, and the second joint of the second arm is configured to pivotally couple to the second container bracket.

In a mounting system according to a further example, the first container bracket and the second container bracket each include a first pair of flanges. Each of the first arm and the second arm has a second pair of flanges. Each flange of the first pair of flanges and each flange of the second pair of flanges has an aperture. The second joint of each of the first and the second arms includes a pin that extends through the apertures in each of the flanges of the first pair of flanges and each of the flanges of the second pair of flanges to connect the first and second arms to the first and second brackets, respectively, and wherein the pin is manually removable from the apertures in each of the flanges of the first pair of flanges and each of the flanges of the second pair of flanges to disconnect the first and second arms from the first and second container brackets.

In a mounting system according to a further example, the apertures in each of the flanges of the first pair of flanges align with the apertures in each of the flanges of the second pair of flanges to receive the pin.

A mounting system according to a further example further includes a cotter pin. In addition, the pin includes an aperture for receiving the cotter pin, when the pin is extended through the apertures in the flanges of the first pair of flanges and the flanges of the second pair of flanges, to inhibit removal of the pin from the flanges of the first pair of flanges and the flanges of the second pair of flanges.

In a mounting system according to a further example, at least one of the flanges of the first pair of flanges of each container bracket has a lock aperture for receiving a locking mechanism. In addition, the cotter pin includes a loop portion defining a central opening. The central opening of the cotter pin is configured to align with the lock aperture to receive the locking mechanism through the central opening and the lock aperture, when the cotter pin is received in the aperture of the pin.

A mounting system according to a further example further includes a first sidewall mounting bracket for mounting to the first sidewall of the bed, and a second sidewall mounting bracket for mounting to a second sidewall of the bed. The first joint pivotally attaches the first end of the first arm body to the first sidewall mounting bracket for pivotal movement relative to the first sidewall of the bed when the first sidewall mounting bracket is mounted to the first sidewall of the bed. The second joint pivotally attaches the first end of the second arm body to the second sidewall mounting bracket for pivotal movement relative to the second sidewall of the bed when the first sidewall mounting bracket is mounted to the second sidewall of the bed.

In a mounting system according to a further example, the first end of the first arm body is wider in a width dimension than the second end of the first arm body. The first joint of the first arm includes first and second joint portion on respectively opposite sides of the width dimension of the first end of the first arm body.

In a mounting system according to a further example, the first end of the second arm body is wider in a width dimension than the second end of the second arm body. The first joint of the second arm includes first and second joint portion on respectively opposite sides of the width dimension of the first end of the second arm body.

In a mounting system according to a further example, the arm body of each arm comprises a plurality of sections that are arranged adjacent to each other and slidable relative to each other in the length dimension of the arm body, to adjust the length dimension of the arm body.

A mounting system according to a further example further includes at least one fastener that connects the plurality of sections of the arm body together for sliding motion.

In a mounting system according to a further example, the plurality of sections of the arm body include a first section having a first aperture through which the at least one fastener extends, and a second section having an elongated aperture having a length dimension extending along at least a portion of the length dimension of the arm body and through which the at least one fastener extends. The at least one fastener is configured to be selectively loosened to allow the plurality of sections of the arm body to slide relative to each other while the at least one fastener moves along the length dimension of the elongated aperture to adjust the length of the arm body, and to be selectively tightened to lock or fix the length of the arm body.

According to an example embodiment, a mounting system for securing a container to a bed of a vehicle or other installation location includes a sidewall mounting bracket for mounting to a first sidewall of the bed, and an arm body having a length dimension, where the arm body is adjustable in the length dimension. A first joint pivotally attaches a first end of the arm body to the sidewall mounting bracket for pivotal movement relative to the first sidewall of the bed when the sidewall mounting bracket is mounted to the first sidewall of the bed. A second joint is for attaching a second end of the arm body to the container.

In a mounting system according to a further example, the mounting system further includes a second sidewall mounting bracket for mounting to a second sidewall of the bed, a second arm body having a length dimension, the second arm body being adjustable in the length dimension. Another first joint pivotally attaches a first end of the second arm body to the second sidewall mounting bracket for pivotal movement relative to the second sidewall of the bed when the second sidewall mounting bracket is mounted to the second sidewall of the bed. A further second joint is for attaching a second end of the second arm body to the container.

A mounting system according to a further example further includes the container, a first container bracket on a first side of the container, and a second container bracket on the second side of the container. The second joint of the first arm is configured to couple to the first container bracket, and the second joint of the second arm is configured to couple to the second container bracket.

In a mounting system according to a further example, the first container bracket and the second container bracket each include a first pair of flanges. Each of the first arm body and the second arm body has a second pair of flanges. Each flange of the first pair of flanges and each flange of the second pair of flanges has an aperture, and each of the second joints comprises a pin that extends through the apertures in each of the flanges of the first pair of flanges and each of the flanges of the second pair of flanges to connect the first and second arms to the first and second brackets, respectively. The pin is manually removable from the apertures in each of the flanges of the first pair of flanges and each of the flanges of the second pair of flanges to disconnect the first and second arms from the first and second container brackets.

A mounting system according to a further example further includes the container and a container bracket for selectively attaching to the arm body through the second joint.

BRIEF DESCRIPTION OF THE DRAWINGS

The above and other aspects and features of the present invention will become more apparent to those skilled in the art from the following detailed description of the example embodiments with reference to the accompanying drawings, in which.

DETAILED DESCRIPTION

Figure 1:
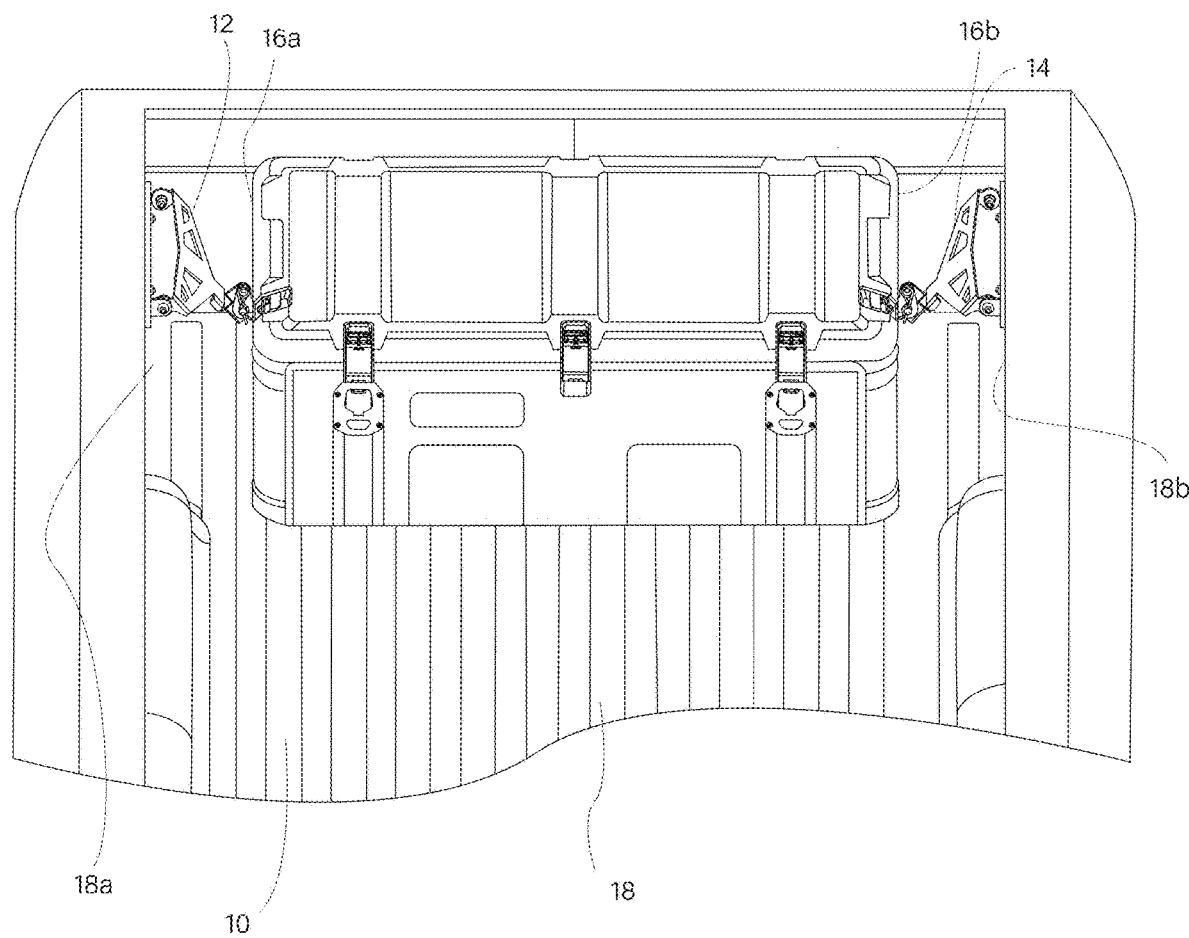
FIG. 1 is a perspective view of a mounting system in a vehicle bed, according to an exemplary embodiment.

Hereinafter, example embodiments will be described in more detail with reference to the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

Embodiments described herein relate to mounting systems that may be used in various contexts, for mounting one or more containers, trunks or cases (hereinafter "container" or "containers") onto a bed of a vehicle. In some examples, the mounting system may be configured to mount other types of objects, items or cargo to the bed of a vehicle, or to mount containers, trunks or cases (or other cargo) on a surface of a warehouse, shelf, or other structure. Certain embodiments include a system having a pair of arms configured to securing to opposite sides of a container, while other embodiments include a system of one or more pairs of arms in combination with one or more containers.

Figure 2:
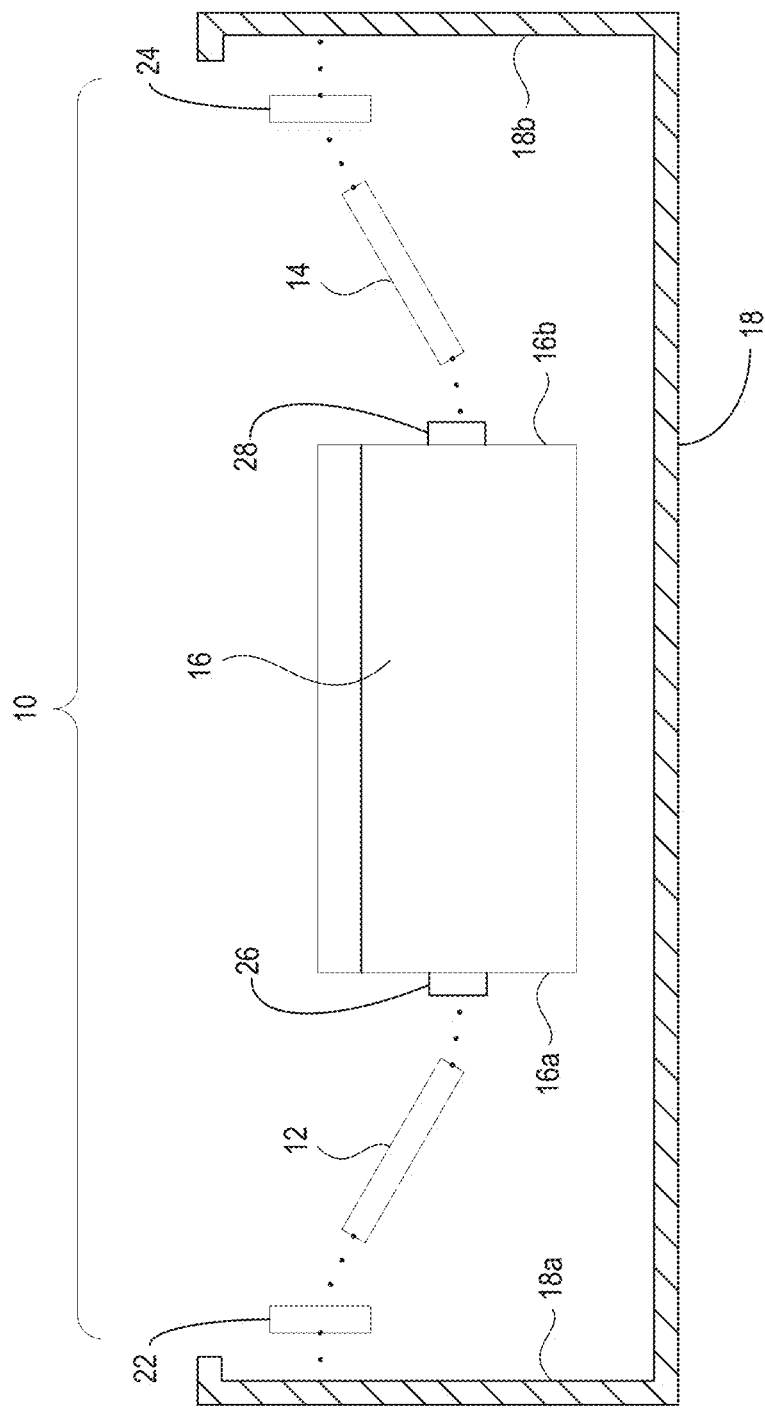
FIG. 2 is a partially exploded, schematic diagram of the mounting system and the vehicle bed of FIG. 1.

An example embodiment of a mounting system 10 is shown in FIGS. 1 and 2, and includes a pair of arms 12 and 14 configured to secure a container 16 to a bed 18 of a vehicle such as, but not limited to, a pickup truck. In certain examples, the system 1 includes the pair of arms 12 and 14 with or without mounting hardware. In certain other examples, the system 1 includes the arms 12 and 14 and also includes a container 16, with or without mounting hardware.

In particular examples, each of the arms 12 and 14 has a first end (upper end in FIGS. 1 and 2) that is configured to mount (at a first joint 12a or 14a of the arm) to a respective sidewall of a vehicle bed 18. In one example, the vehicle bed 18 is a bed of a standard pickup truck such as, but not limited to a Toyota Tacoma, Toyota Tundra, Ford F-150, Ford Raptor, Ford Ranger, Chevrolet Silverado, GMC Sierra, Dodge Ram, Nissan Frontier, Nissan Titan, Jeep Gladiator, or the like. In other examples, the bed 18 is a bed of another pickup truck or other type of truck or other wheeled vehicle. In certain examples, the bed 18 is a cargo bed or deck of a train car, ship, plane or other type of vehicle. In particular examples, the arms 12 and 14 or sidewall mounting brackets 22 and 24 (discussed below) and hardware associated with the arms 12 and 14 are configured to mount to certain standard structural features (such as, but not limited to flanges, rails or contoured surfaces) on a sidewall of a pickup truck bed as described herein.

Container

The container 16 may be configured for specific contexts and applications of use (for containing, transporting, storing or the like, of specific objects, items or cargo or specific types of objects, items or cargo). However, containers included in or used with further example embodiments described herein may be used for more general contexts and applications of use (for multiple types of cargo). Such containers may be configured to hold cargo, to protect cargo from damage, to form a barrier between hazardous material and cargo, or any combination thereof.

In certain examples, the container 16 may include an outer shell structure having an interior volume configured to hold one or more objects, items, goods, fragile or breakable articles, tools, equipment, live cargo, biological cargo, or the like (cargo). In some examples, the outer shell structure of the container 16 may include one or more (or a plurality of) side walls (including side walls 16a and 16b), a bottom wall and a top wall, surrounding the hollow or partially hollow interior volume. One of the side, bottom or top walls may form a door or lid, for selectively closing the interior volume or opening and providing access to the interior volume. In the illustrated examples, the container 16 has four side walls, a bottom wall and a top wall that forms a lid, enclosing an interior volume (not shown). In particular examples, the outer shell of the container 16 has a generally square cube shape or a generally rectangular cube shape. However, in other examples, the outer shell of the container may have other suitable shapes including, but not limited to other polygonal cubic shapes, curved shapes or shapes having a combination of flat and curved surfaces.

In some examples, the lid or top wall of the container 16 is selectively moveable or removable (relative to the side walls) to selectively open or close the container 16. In some embodiments, the container 16 includes one or more hinges coupled to one of the side walls of the container 16 and the lid or top wall, to facilitate selective pivoting of the lid or top wall relative to the side walls between a closed configuration and an open configuration. The closed configuration being when the lid or top wall is in a closed state to isolate or partially isolate the interior from an ambient environment outside of the outer shell of the container 16. The open configuration being when the lid or top wall is in an open state such that the interior is open to the ambient environment. In other embodiments, the lid or top wall of the container 16 is coupled to one or more of the side walls of the container 16 via fasteners (e.g., screws, nails, rivets, etc.) or adhesive (e.g., glue, tape, etc.). In certain examples, the outer shell and (or) the side walls of the container 16 may include one or more latches or locks to selectively latch or lock the lid or top wall to the side walls, and to selectively unlatch or lock the lid or top wall from the side walls of the container 16 and allow the lid or top wall to be pivoted, moved or removed to open the outer shell and allow access to the interior.

The outer shell and lid of the container 16 may be formed of a suitably rigid material that holds its shape and resists impacts up to a definable magnitude of force. For example, the outer shell and lid of the container 16 may be made of one or more (or any combination) of plastic or other polymer, metal, wood, composite material, or the like. The outer shell and lid of the container 16 may be made by any suitable manufacturing method or methods including, but not limited to injection molding, rotational molding (roto-molding), blow molding, other molding methods, cutting or other machining, or the like. In particular examples, the outer shell and lid of the container 16 are made of a high strength resin polymer material that can be readily molded into a desired shape.

Brackets 26 and 28 (described below) are secured to or formed on the outer shell of the container 16. In some examples, the brackets 26 and 28 are positioned on opposite sides of the container 16 (i.e., the left and right side walls 16*a* and 16*b* of the container 16 in the orientation shown in FIGS. 1 and 2). In other examples, the brackets 26 and 28 are positioned on front and back walls of the container 16 (and the container 16 may be oriented 90 degrees rotated from the position shown in FIGS. 1 and 2). The brackets 26 and 28 are configured to selectively connect to a second end (the lower end in FIGS. 1 and 2) of the arms 12 and 14, at second joints 12*b* and 14*b* of the arms, respectively. The arms 12 and 14, when connected (through the first joints 12*a* and 14*a*) to the sidewalls of the vehicle bed, and also connected (through the second joints 12*b* and 14*b*) to the brackets 26 and 28 on the container 16, help to reduce or minimize movement of the container 16 relative to the vehicle bed 18.

Arms

The arm 12 is configured to be arranged between and connect to a first sidewall 18*a* of the vehicle bed 18 (the left sidewall in FIGS. 1 and 2) and the first side wall 16*a* of the container 16 (the left side in FIGS. 1 and 2). Similarly, the arm 14 is configured to be arranged between and connect to the second sidewall 18*b* of the vehicle bed 18 (the right sidewall in FIGS. 1 and 2) and a second side wall 16*b* of the container 16 (the right side in FIGS. 1 and 2). Each of the arms 12 and 14 may comprise generally rigid structures made of any suitable material or materials such as, but not limited to, metal, plastic, wood, composite materials, combinations thereof, or the like. In some examples, one or both of the arms 12 and 14 may include one or more elastic or flexible structures or sections, for example, springs, rubber, or the like, that allow, but dampen movement of the container 16 relative to the vehicle bed 18. In other examples, the arms 12 and 14 are generally rigid and have no elastic or flexible sections.

In particular examples as shown in the illustrated embodiments, the arms 12 and 14 are identical to each other and interchangeable with each other. Accordingly, the description herein of the arm 12 (including its connection and operation with sidewall mounting bracket 22 and container bracket 26), can be understood to also correspond to the arm 14 (including its connection and operation with sidewall mounting bracket 24 and container bracket 28). In other examples, the arms 12 and 14 may include opposite facing (mirror image) features or other differences.

Figure 4:
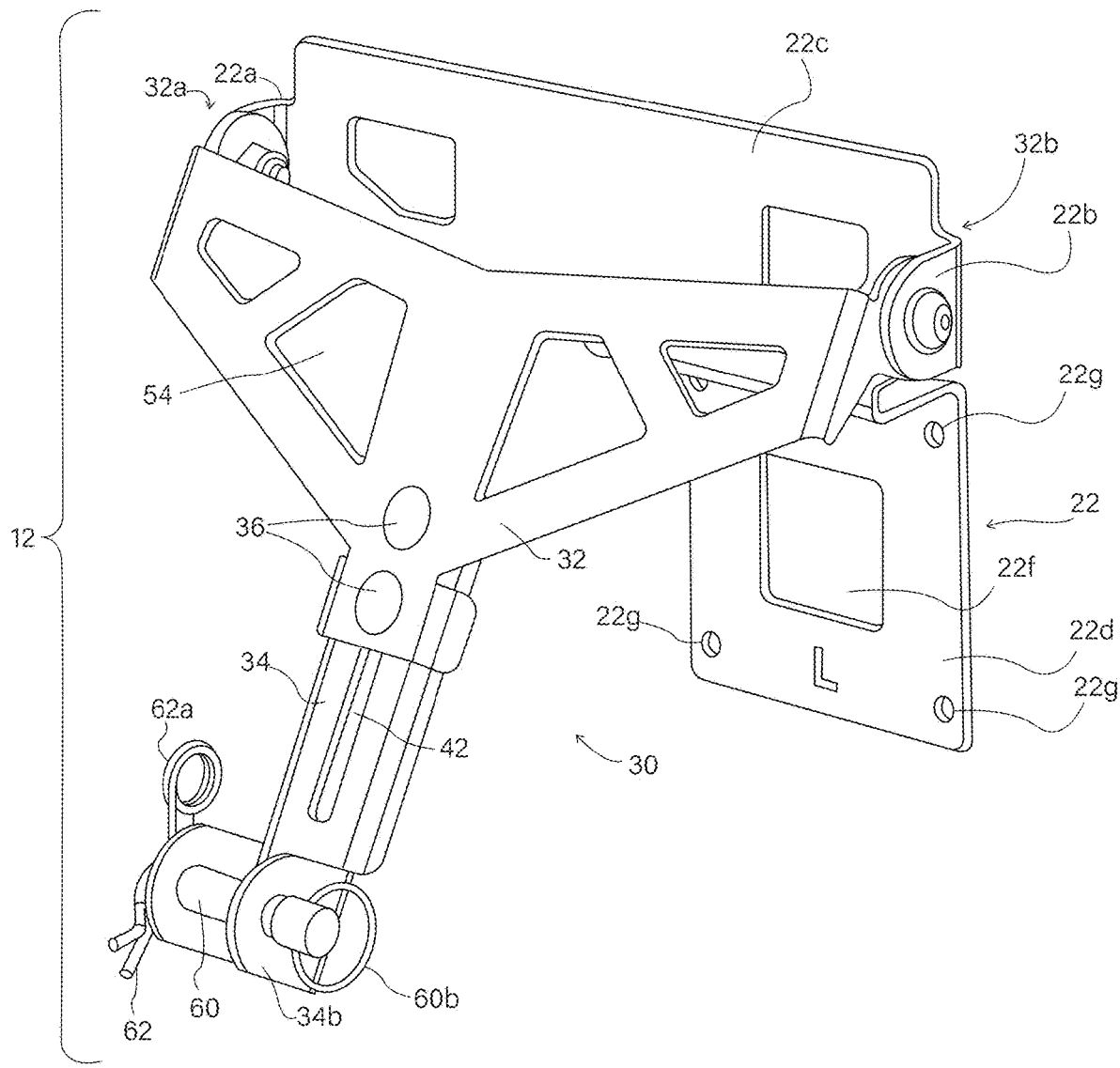
FIG. 4 is a perspective view of the arm of FIGS. 1-3.
Figure 5:
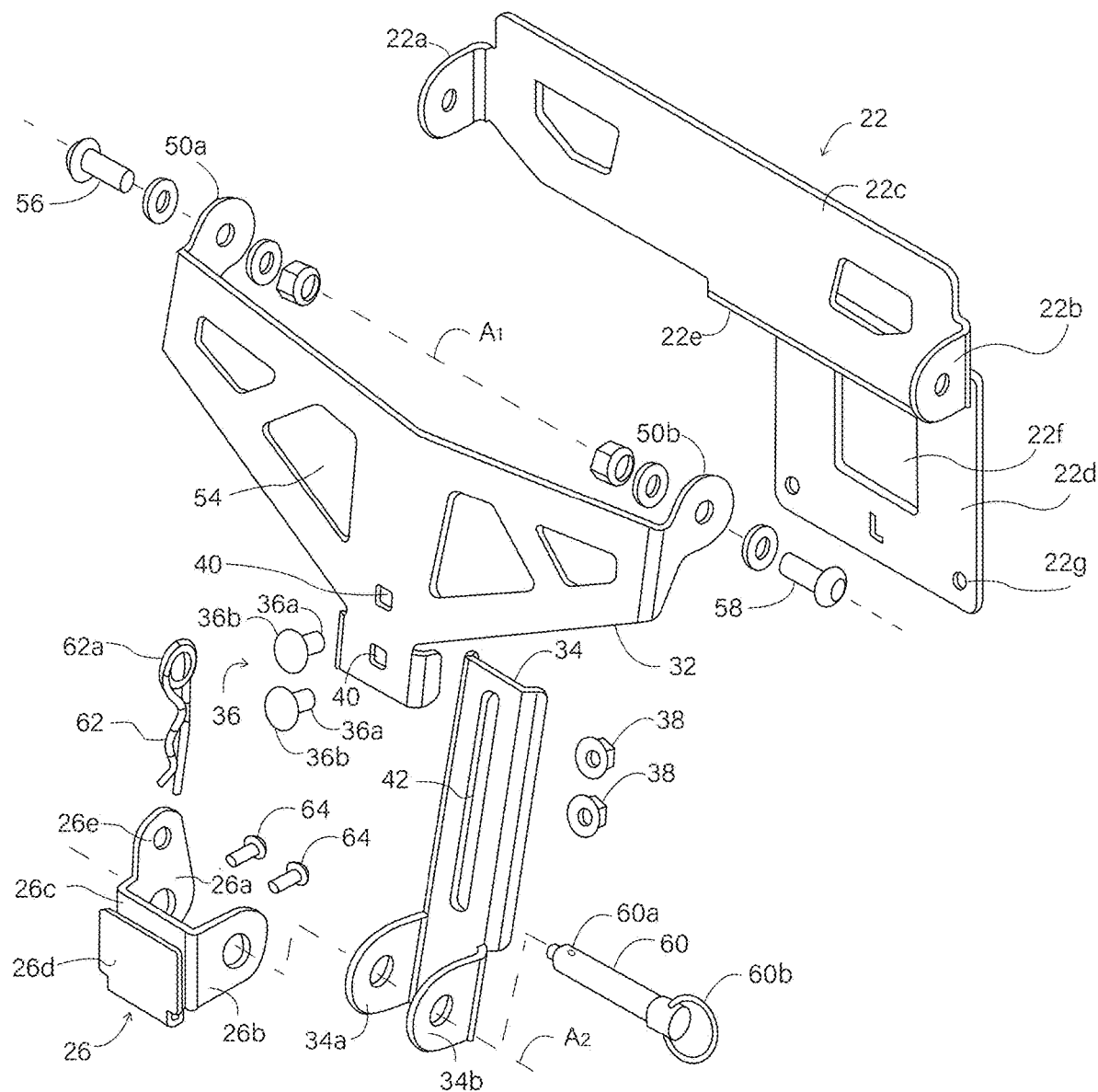
FIG. 5 is an exploded, perspective view of the arm of FIG. 4.
Figure 6:
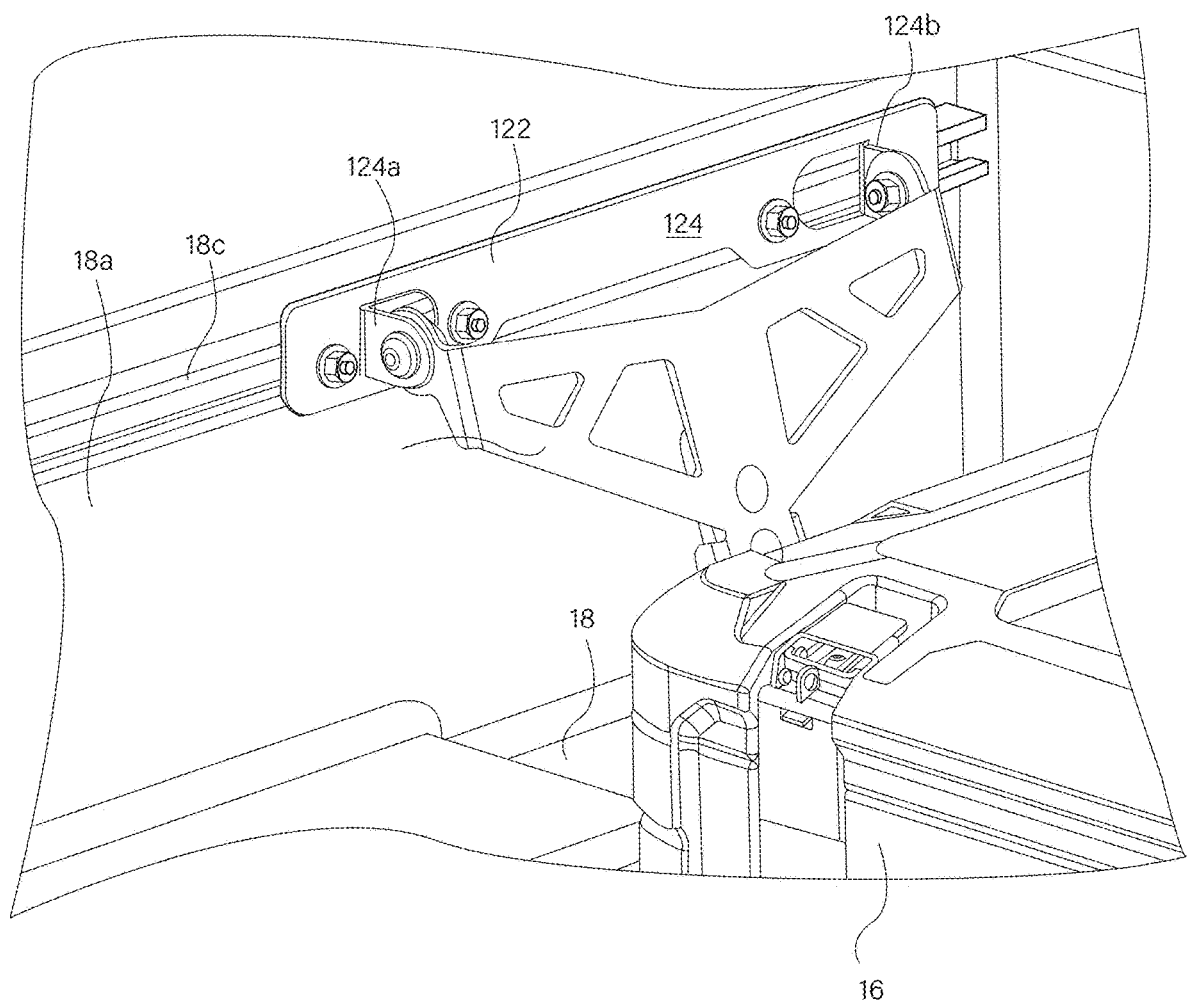
FIG. 6 is a perspective view of a portion of a container, with an arm and another example of a sidewall mounting bracket attached to a first sidewall of a vehicle bed, according to an exemplary embodiment.
Figure 7:
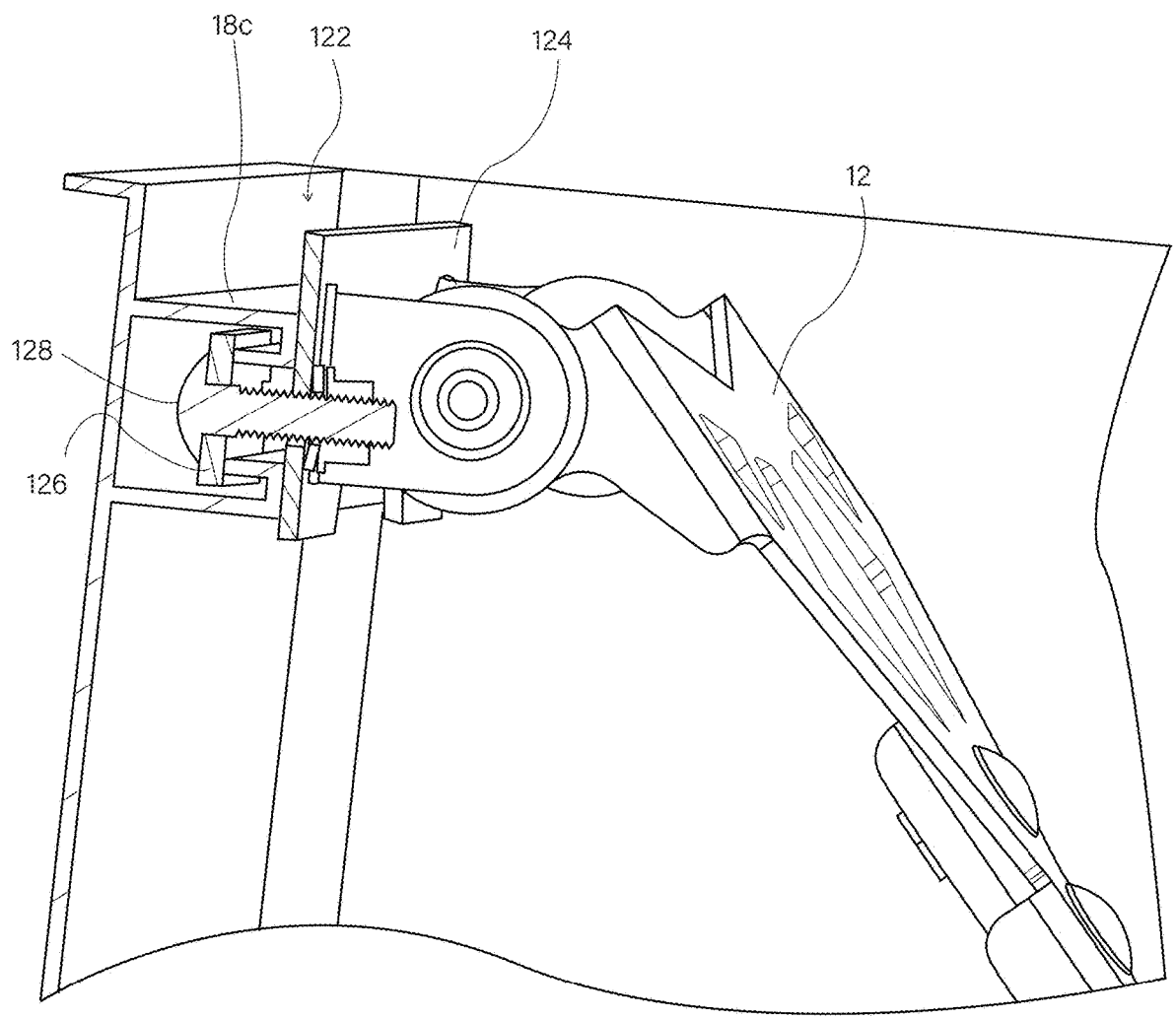
FIG. 7 is a partial section view of the arm and sidewall mounting bracket of FIG. 6 attached to a rail on a sidewall of a vehicle bed.

Each of the arms 12 and 14 include an arm body (e.g., arm body 30 of arm 12 shown in FIGS. 4 and 5). The arm body 30 interfaces with and connects to a first sidewall mounting bracket 22 that mounts on the first sidewall 18*a* of the vehicle bed 18. Similarly, the arm body of the arm 14 interfaces with and connects to a second sidewall mounting bracket 24 that mounts on the second sidewall 18*b* of the vehicle bed 18. The arm body of each of the arms 12 and 14 may interface and connect to a respective one of the sidewall mounting brackets 22 and 24 through a first joint, such as a first pivotal joint, for pivotal motion relative to the sidewall of the vehicle bed.

The arm body 30 of the arm 12 also interfaces with and connects to the container bracket 26 on one side of the container 16. Similarly, the arm body of the arm 14 interfaces with and connects to the container bracket 28 on the other side of the container 16. In some examples, the arm body of each of the arms 12 and 14 may interface and connect to a respective one of the container brackets 26 and 28 through a second joint (such as a second pivotal joint), for pivotal motion relative to the sidewall of the side walls of the container 16. In other examples, one or both of the first and second joints may be rigid and not pivotal.

In some examples, the arm body 30 is configured to removably connect to one or both of the sidewall bracket mounting 22 (or 24) or the container bracket 26 (or 28), to facilitate mounting or removal of the sidewall brackets on the vehicle bed, to facilitate mounting of the container to the arm 12 (or 14), or to facilitate replacement or servicing of a bracket or arm.

The arm body 30 of the arm 12 has a length dimension from the first end 12*a* to the second end 12*b* of the arm 12. Similarly, the arm body of the arm 14 has a length dimension from the first end 14*a* to the second end 14*b* of the arm 14. In some examples, the length dimensions of the arms 12 and 14 is adjustable (to expand or contract the length dimension of the arm body). In particular examples, the arm body has two sections that are connected, but slidable relative to each other, to adjust the length dimension.

Figure 3:
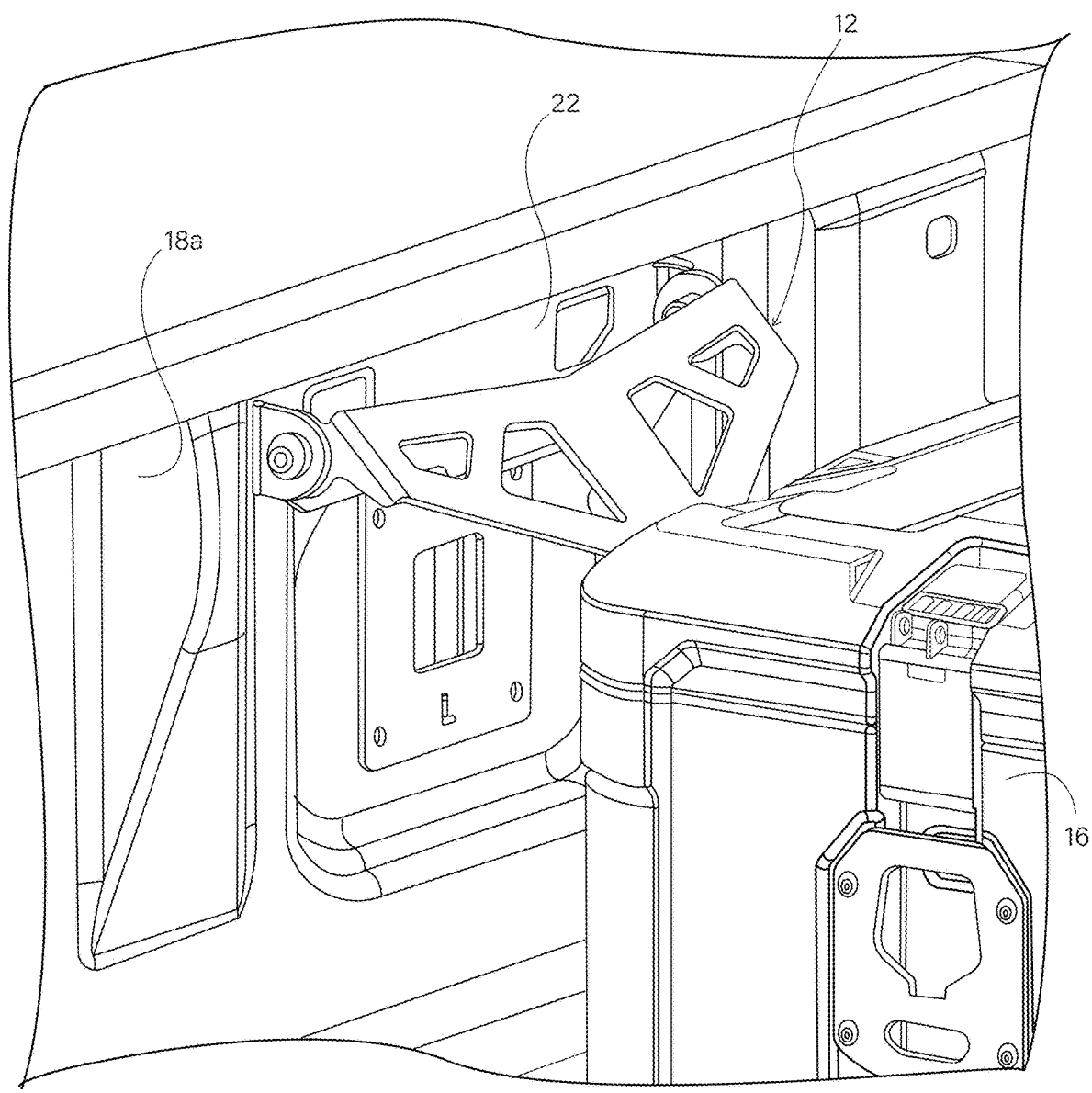
FIG. 3 is a perspective view of a portion of a container, with an arm and a sidewall mounting bracket of the mounting system of FIG. 1, attached to a first sidewall of a vehicle bed, according to an exemplary embodiment.

With reference to FIGS. 3-5, the arm body 30 has a first section 32 and a second section 34, that are connected together with one or more fasteners 36 and that are slidable relative to each other. More specifically, the one or more fasteners 36 may include one or more bolts, each having a threaded shaft 36*a* and a head 36*b*, and one or more nuts or other threaded member 38, each configured to threadingly engage the threaded shaft 36*a*. The first section 32 of the arm body 30 has one or more apertures 40 through which the threaded shaft 36*a* of each fasteners 36 extend, but that are small enough to inhibit the head 36*b* of each fastener 36 to pass. The second section 34 has a slot-shaped opening 42 extending along at least a portion of its length dimension, through which a portion of the threaded shaft 36*a* of each fastener 36 extends. In other embodiments, the locations of the one or more apertures 40 and slot-shaped openings 42 may be reversed, such that the one or more apertures 40 are on the second section 34 of the arm body 30, and the one or more slot-shaped opening 42 is on the first section 32 of the arm body 30.

A respective nut or other threaded member 38 is arranged on the opposite side of the second section 34 relative to the first section 32 of the arm body 30, and threadingly connects to the threaded shaft 36*a* of each fastener 36. The nut or threaded member 38 may be selectively tightened or loosened on the threaded shaft 36*a* of the fastener 36, by rotating the nut or threaded member 38 relative to the threaded shaft 36*a*. Accordingly, the one or more fasteners may be selectively tightened or loosened, to selectively tighten or loosen the connection of the first section 32 and the second section 34 of the arm body 30. When the one or more fasteners are sufficiently loosened, the threaded shaft 36*a* of each fastener is held in the aperture 40 of the first section 32 of the arm body 30, but is able to move along the length-wise direction of the slot-shaped opening 42 in the second section 34 of the arm body 30.

In that manner, the one or more fasteners 36 are configured to be selectively loosened to a state in which the first section 32 and the second section 34 may be slid relative to each other by applying manual force in the length dimension of the arm body 30, to selectively extend or contract the length dimension of the arm body 30. In addition, the one or more fasteners 36 are configured to be selectively tightened to a state at which the first section 32 and the second section 34 are locked or inhibited from sliding relative to each other, to selectively fix or lock a length dimension of the arm body 30. Accordingly, when the one or more fasteners 36 are in a loosened state, a user may manually slide the first and second sections 32 and 34 relative to each other and manually adjust the length of the arm body 30 to an adjusted length. Then, the user may tighten the one or more fasteners 36 to fix or lock the length dimension of the arm body 30 (and the arm 12) at the adjusted length.

In other embodiments, other suitable configurations for connecting the first and second sections 32 and 34 of the arm body 30 for selectively allowing sliding or other relative movement to adjust the length of the arm body 30, or for selectively fixing or locking the first and section sections 32 and 34 in an adjusted length dimension may be used.

In certain examples, the first and second sections 32 and 34 of the arm body 30 may include one or more features to assist with guiding the sliding and/or connecting or retaining the first and second sections 32 and 34 together during sliding adjustment. In the illustrated example, the first section 32 includes a pair of flanges 44, and the second section 34 includes a pair of rails 46 that slide between the flanges 44, to help guide the sliding movement between the first and second sections 32 and 34 of the arm body 30. In certain examples, the pair of flanges 44 and the pair of rails 46 may include mating features that help guide the sliding movement such as, but not limited to slots or grooves and mating ribs or protrusions along the respective length dimensions of the flanges 44 and rails 46. In certain examples, the rails 46 (or the second section 34) may have a dovetail cross-section shape (on a cross-section perpendicular to the length dimension of the arm body 30 of the arm 12), and the flanges 44 may form a correspondingly-shaped channel in which the dovetail-shape may slide.

In the example in FIGS. 3-5, the first section 32 of the arm body 30 has a first end that pivotally connects to the sidewall mounting bracket 22, through a pivot joint. In the illustrated examples, the first section 32 has a second end (opposite the first end) on which the flanges 44 are provided. In particular examples, the first end of the first section 32 has a width dimension (in the generally horizontal dimension of the drawing of FIGS. 3-5) that is substantially wider than the width dimension of the second end of the first section 32.

The wider first end of the first section 32 allows the pivot joint to include two (or more) joint sections 32a and 32b at two (or more) locations that are spaced apart along some or all of the width dimension of the first section 32. A sufficiently wide horizontal spacing of two (or more) pivot joint sections 32a and 32b can distribute a load over a relatively wide spacing and can help to increase strength and stability of the mounting system, particularly in the horizontal dimension of the arm 12. However, in other examples, the width dimension of the first side end of the first section 32 is the same as or is smaller than the width dimension of the second end of the first section 32.

In the illustrated examples, the wider first end of the first section 32 angles or tapers toward the narrower second end of the first section 32, to form an A-frame shape or swept wing shape. An angled or tapered shape can help to increase strength and stability of the mounting system, particularly in the horizontal dimension of the arm 12. In some examples, the first section 32 of the arm body 30 can include one or more openings 54 to reduce material or weight of the arm body 30.

The pivot joint section 32a includes a flange 50a on the first section 32 of the arm body 30 that pivotally connects to a flange 22a on the sidewall mounting bracket 22. Similarly, the pivot joint section 32b includes a flange 50b on the first section 32 of the arm body 30 that pivotally connects to a flange 22b on the sidewall mounting bracket 22. A first fastener 56 pivotally connects the flange 50a with the flange 22a, and a second fastener 58 pivotally connects the flange 50b with the flange 22a, for pivotal movement of the arm section 32 relative to the sidewall mounting bracket 22, about an axis $A_1$ (a generally horizontal axis in the orientation shown in FIG. 5). The first and second fasteners 56 and 58 may be any suitable fasteners that connect and allow relative pivotal motion of the flanges. In particular examples, the first and second fasteners 56 and 58 are arranged to be accessible and selectively removable by a user, when the mounting system is in an installed state in a vehicle bed, or selectively connectable by a user to install an arm body 30 to a sidewall mounting bracket 22. In some examples, each of the flanges 22a, 22b, 50a and 50b include an opening for receiving a fastener. In the illustrated examples, the first and second fasteners 56 and 58 include a pair of threaded bolts that extend through openings in flanges 22a and 50a and through the openings in flanges 22b and 50b, respectively, a nut or other threaded member threaded on the end of each of the bolts, and one or more washers on each bolt. In other examples, the first and second fasteners 56 and 58 may include other suitable fastener structures, including but not limited to rivets or other permanent or selectively removable fasteners or pivotal fasteners, for connecting the arm body 30 to the sidewall mounting bracket 22.

In certain examples, the arm body 30 is connectable to any one of multiple different sidewall mounting brackets that are configured for multiple different vehicle beds or bed installations. Accordingly, the same arm body 30 may be manufactured and used for any one of multiple different sidewall mounting brackets and, thus, multiple different vehicle beds, as described below.

In the example in FIGS. 3-5, the second section 34 of the arm body 30 has a lengthwise dimension, with the slot-shaped opening 40 and the rails 46 extending along at least a portion of its length dimension. One end (a connection end) of the second section 34 is configured to connect with the container bracket 26, with one or more fasteners. In particular embodiments, the one or more fasteners are configured to allow a user to selectively connect and disconnect the connection end of the second section 34 to the container bracket 26 (to selectively connect or disconnect the arm 12 to a container 16) in a relatively simple, operation that can be carried out manually and quickly. In particular embodiments, the one or more fasteners pivotally connects with the container bracket 26 through a pivot joint.

In the example in FIGS. 3-5, the connection end of the second section 34 of the arm body 30 has a pair of flanges 34a and 34b that connect with a pair of flanges 26a and 26b of the container bracket 26. One or more fasteners is configured to connect the flanges 34a and 34b with the flanges 26a and 26b. In the illustrated example, each of the flanges 26a, 26b, 34a and 34b includes an opening that align with the other openings along an axis $A_2$, and the fastener includes a removable pin 60 that extends along the axis $A_2$ and through the openings in the flanges to fasten the flanges 26a and 26b to the flanges 34a and 34b. The pin 60 has a length dimension and includes a first end portion having a cotter pin opening 60a, and a second end portion having a wire loop or other feature forming a handle 60b. The cotter pin opening 60a is configured to receive a cotter pin 62, once the pin 60 is extended through the openings in the flanges 26a, 26b, 34a and 34b. In particular embodiments, the flanges 26a and 34a and the flanges 26b and 34b are pivotally movable relative to each other about the axis $A_2$, when the pin 60 extends through the openings in the flanges. In particular examples, the removable pin 60 and the cotter pin 62 are arranged to be accessible and selectively removable by a user, when the mounting system is in an installed state in a vehicle bed, or selectively connectable by a user to install an arm body 30 to a container 16. In certain examples, the cotter pin 62 includes an annular ring or loop portion 62*a* that has a central opening that can be employed with a padlock or other locking mechanism, as described below.

Sidewall Mounting Brackets

Figure 10:
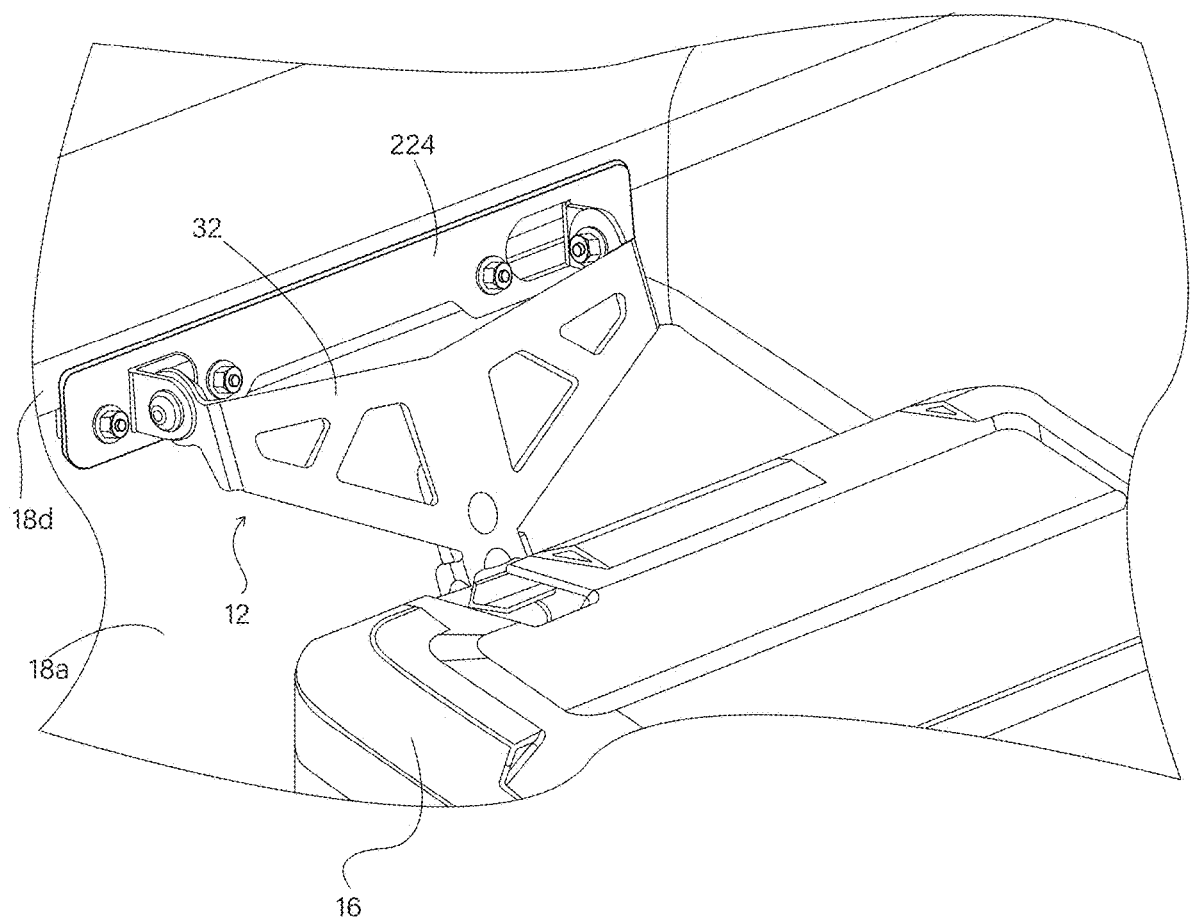
FIG. 10 is a perspective view of a portion of a container, with an arm and another example of a sidewall mounting bracket attached to a first sidewall of a vehicle bed, according to an exemplary embodiment.
Figure 11:
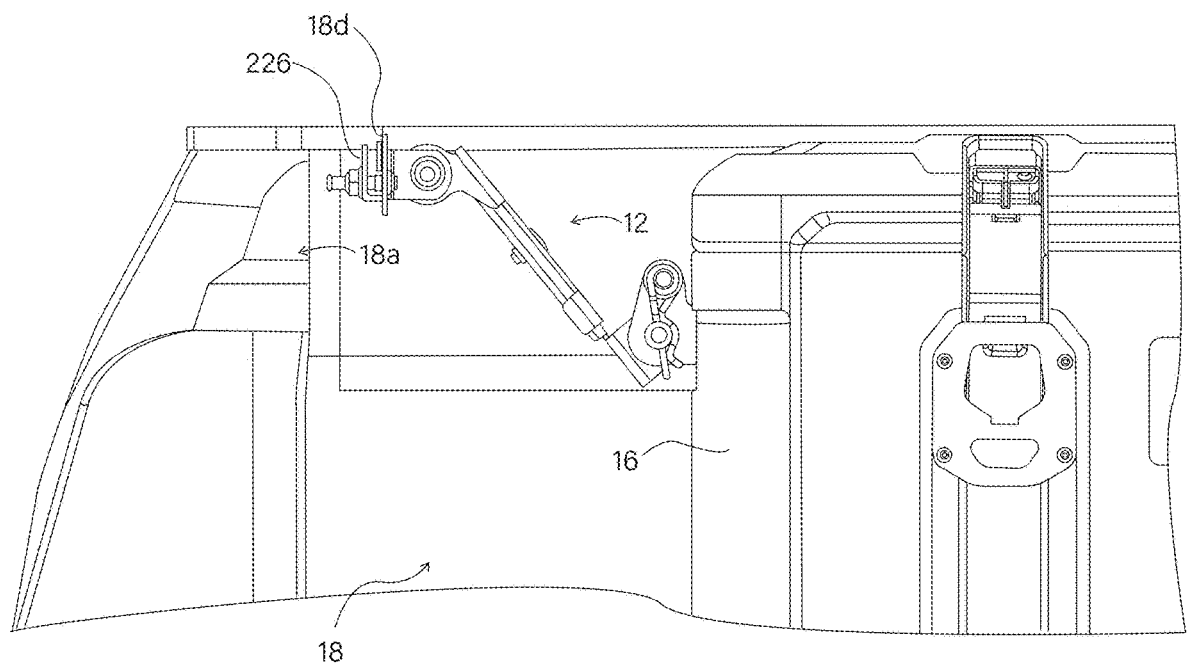
FIG. 11 is a side view of the arm and sidewall mounting bracket of FIG. 10, mounted to a sidewall of a vehicle bed.
Figure 12:
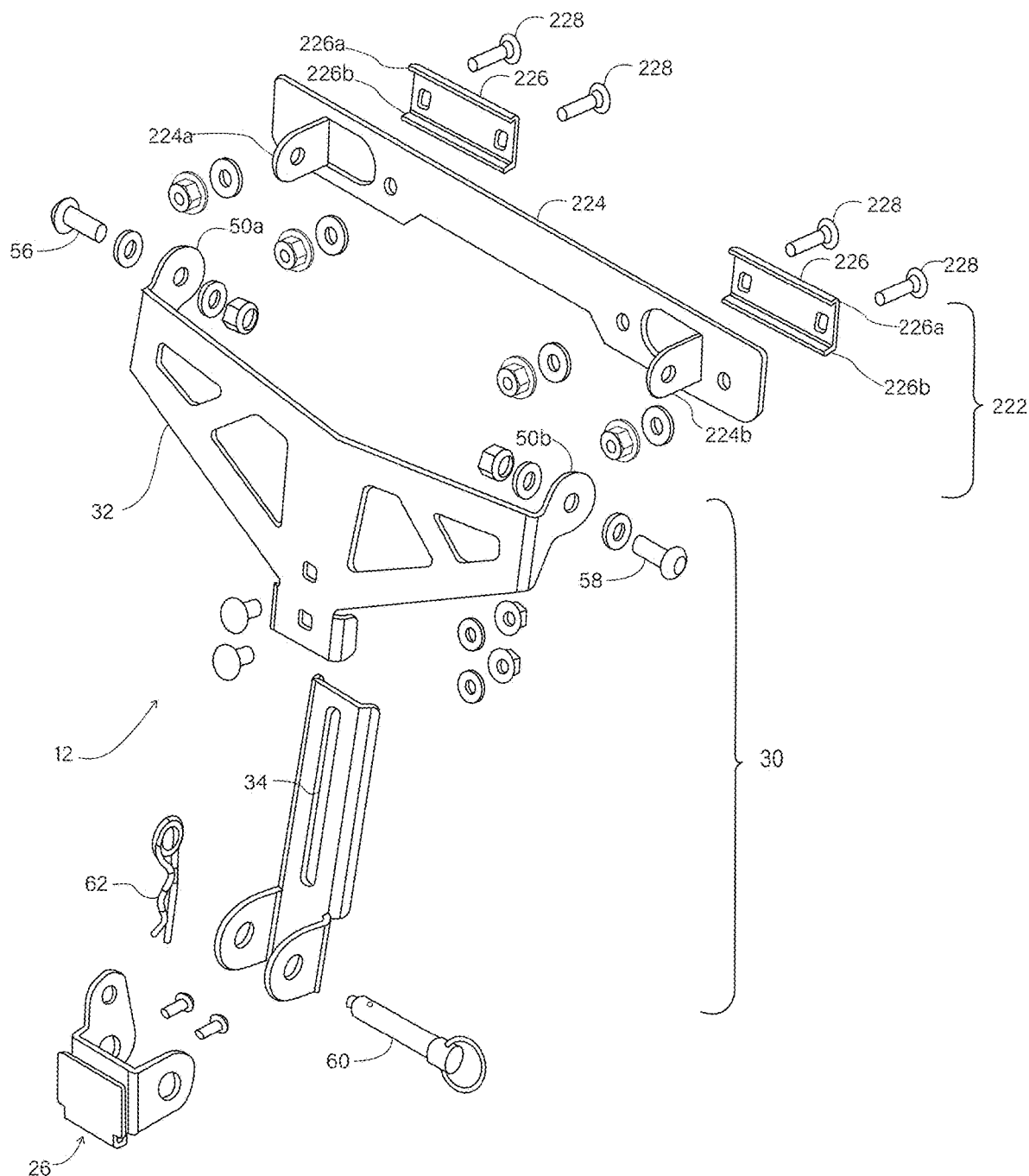
FIG. 12 is an exploded view of the arm and sidewall mounting bracket of FIGS. 10-11.

One example of a sidewall mounting bracket 22 is shown in FIGS. 3-5, while another example of a sidewall mounting bracket 122 is shown in FIGS. 6-9 and yet another example of a sidewall mounting bracket 222 is shown in FIGS. 10-12. In particular examples, the arms 12 and 14 described herein are configured to connect with any of the sidewall mounting brackets 22, 122 or 222 (or other suitable sidewall mounting brackets).

In the example in FIGS. 3-5, the sidewall mounting bracket 22 has a size and shape to fit adjacent and within recesses provided in the sidewalls of a vehicle bed, such as, but not limited to the standard recesses on the sidewalls of certain Ford pickup truck beds or other vehicle bed (or other installation locations). In particular examples, the sidewall mounting bracket 22 is formed as a single, unitary structure. In other examples, the sidewall mounting bracket 22 is formed as multiple components that connect or operate together.

In the example in FIGS. 3-5, the sidewall mounting bracket 22 includes an upper panel section 22*c*, a lower panel section 22*d* and a central panel section 22*e* connecting the upper and lower panel sections. The upper panel section 22*c* and the lower panel section 22*d* have one or more apertures, for engaging or mating with corresponding protrusions or other features on the sidewall of the vehicle bed, or for reducing weight or material of the sidewall mounting bracket 22. In certain examples, a rectangular aperture 22*f* is provided on the lower panel section 22*d*, for engaging and mating with a corresponding rectangular protrusion that is a standard feature on the sidewall of certain Ford pickup trucks. In certain examples, one or more (or each) of the panel sections 22*c*, 22*d* and 22*e* include one or more apertures (such as, but not limited to apertures 22*g* in the lower panel section) for receiving a corresponding one or more fasteners (such as, but not limited to one or more threaded bolt or screw fasteners), to further secure the sidewall mounting bracket 22 to the sidewall of the vehicle bed. In certain examples, the sidewall mounting bracket 22 has a contour, shape and size to fit snuggly against and secure to the sidewall of certain Ford pickup trucks or other pickup trucks (or other installation locations).

In the example in FIGS. 6-9, the sidewall mounting bracket 122 has a size and shape to mount to a standard mounting rail 18*c* provided along at least a portion of the length of each of the sidewalls of certain vehicle beds (or other installation locations). In certain examples, the mounting rail 18*c* is a standard mounting rail provided on the sidewalls 18*a* and 18*b* of a vehicle bed 18, such as, but not limited to the standard mounting rail provided on certain Toyota pickup truck beds. In particular examples, the sidewall mounting bracket 122 includes a first bracket section 124, one or more second bracket sections 126 (two shown in the illustrated example) and one or more (or a plurality of) fasteners 128 for coupling the first bracket section 124 to the one or more second bracket sections 126.

In the example in FIGS. 6-9, the first bracket section 124 includes first and second flanges 124*a* and 124*b* that pivotally connect with the flanges 50*a* and 50*b* of the first section 32 of the arm body 30, via fasteners 56 and 58, similar to the manner in which the flanges 50*a* and 50*b* connect with the flanges 22*a* and 22*b* of the sidewall mounting bracket 22 described above. In other examples, other suitable connection or pivotal connection of the first section 32 of the arm body 30 to the first bracket section 124 may be employed.

Figure 8:
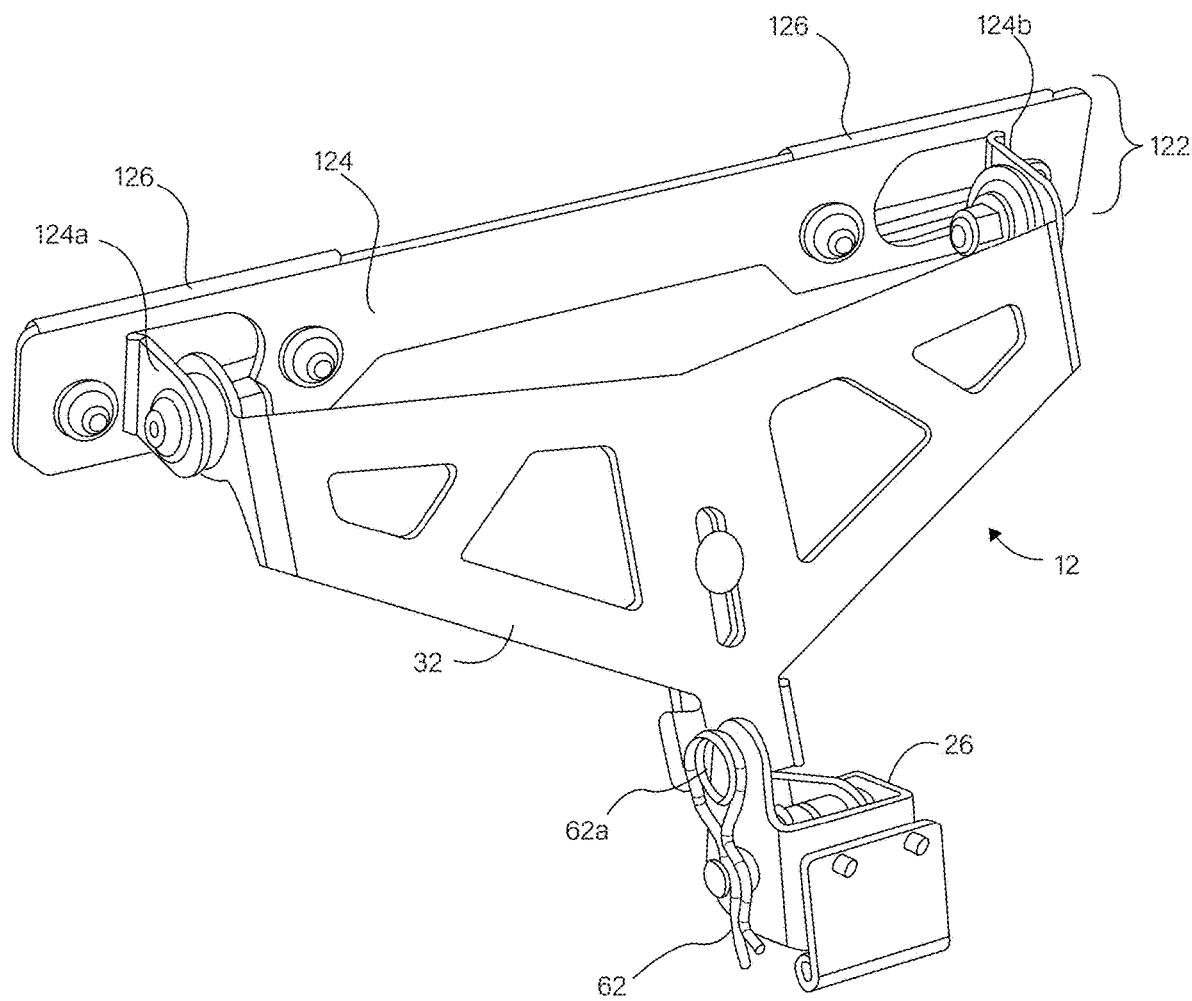
FIG. 8 is a perspective view of the arm and sidewall mounting bracket of FIGS. 6-7.
Figure 9:
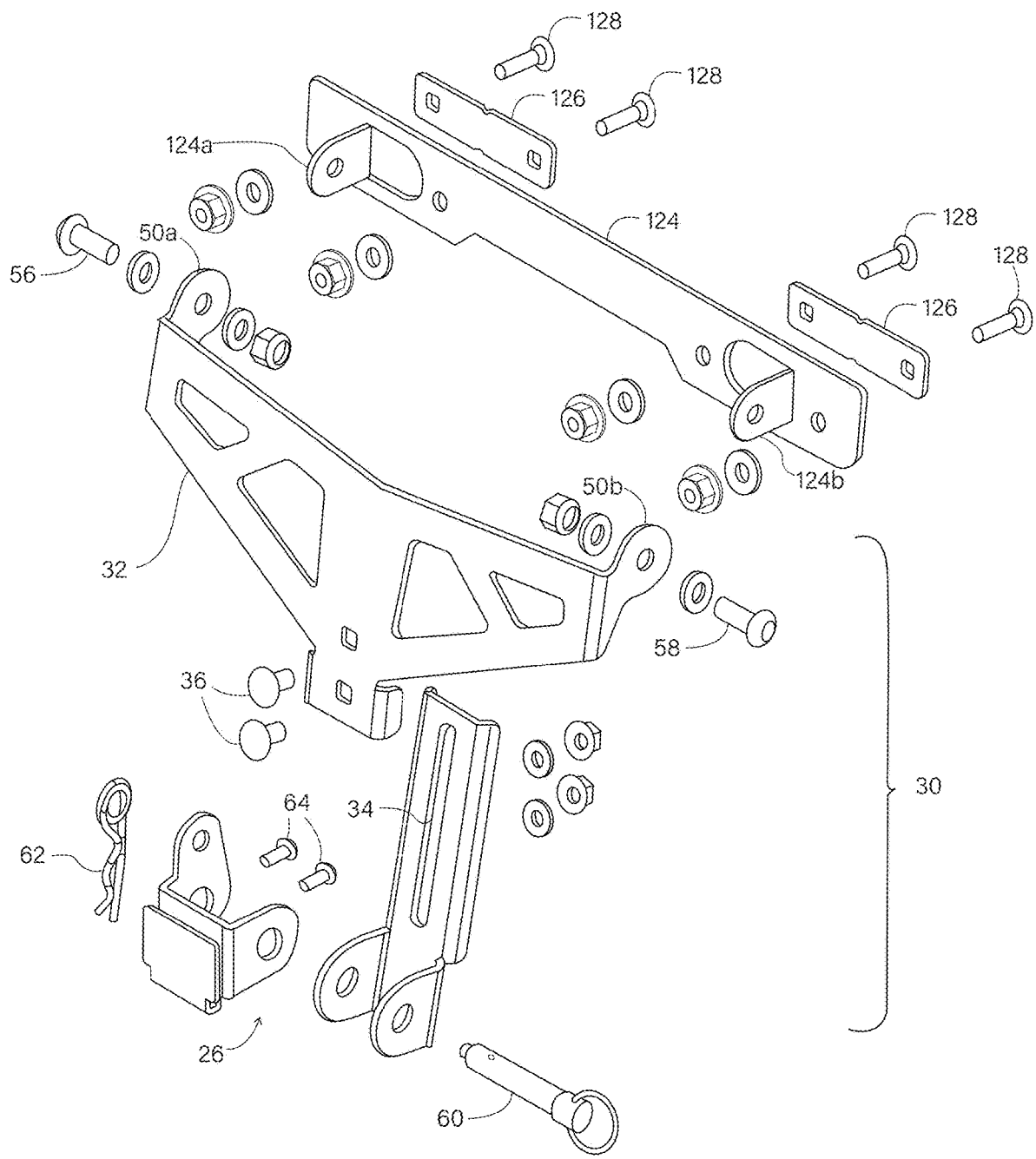
FIG. 9 is an exploded view of the arm and sidewall mounting bracket of FIG. 8.

In the example in FIGS. 6-9, the one or more second bracket sections 126 are configured to be located and held within the rail 18*c*, while the first bracket section 124 is configured to be located adjacent to, but outside of the rail 18*c*. The one or more fasteners 128 are configured to be selectively loosened to allow the position of the first and second bracket sections 124 and 126 to be moved and adjusted, together, along the length of the rail 18*c*, and selectively tightened to lock or fix the position of the first and second bracket sections 124 and 126 on the rail 18*c*. In certain examples, each of the one or more fasteners includes a threaded fastener, such as, but not limited to a threaded bolt or screw and a nut or other threaded member. In certain examples, the threaded bolt or screw of each fastener is threadably connectable to a threaded hole in the second bracket section. In certain examples, each fastener 128 has a threaded shaft portion that extends through an opening in one or both of the bracket sections 126 and 124, and threadably engages a nut or other threaded member on one side of the bracket section 124 (or of the bracket section 126). In other examples, other suitable fasteners may be employed for selectively fastening the bracket sections 124 and 126 together, with a portion of the rail 18*c* between the bracket sections 124 and 126. FIG. 8 shows the arm body of the arm 12 connected at its first end, to the sidewall mounting bracket 122, and connected at its second end, to the container bracket 62.

In the example in FIGS. 10-12, the sidewall mounting bracket 222 has a size and shape to mount to a ledge or flange provided on the upper edge of the sidewalls of certain vehicle beds (or other installation locations). In certain examples, the ledge or flange is a standard ledge 18*d* provided on the sidewalls 18*a* and 18*b* of certain Ford pickup truck bed or other vehicle bed (or other installation locations). In particular examples, the sidewall mounting bracket 222 includes a first bracket section 224, one or more second bracket sections 226 (two shown in the illustrated example), and one or more (or a plurality of) fasteners 228 for coupling the first bracket section 224 to the one or more second bracket sections 226.

In the example in FIGS. 10-12, the first bracket section 224 is configured similar to the first bracket section 124 described with reference to FIGS. 6-9, and includes first and second flanges 224*a* and 224*b* that pivotally connect with the flanges 50*a* and 50*b* of the first section 32 of the arm body 30, via fasteners 56 and 58, similar to the manner in which the flanges 50*a* and 50*b* connect with the flanges 22*a* and 22*b* of the sidewall mounting bracket 22 described above. In other examples, other suitable connection or pivotal connection of the first section 32 of the arm body 30 to the first bracket section 224 may be employed.

In the example in FIGS. 10-12, the one or more second bracket sections 226 are configured to be located and held on one side of the flange or lip 18*d*, while the first bracket section 224 is located adjacent to the other side of the flange or lip 18*d* (i.e., the side facing the interior of the bed 18). The one or more fasteners 228 are configured to be selectively loosened to allow the position of the first and second bracket sections 224 and 226 to be connected together, but moved and adjusted, together, along the length of the flange or lip 18d, and selectively tightened to lock or fix the position of the first and second bracket sections 224 and 226 on the flange or lip 18d. In certain examples, each of the one or more fasteners includes a threaded fastener, such as, but not limited to a threaded bolt or screw and a nut or other threaded member. In certain examples, each fastener 228 has a threaded shaft portion that extends through an opening in one or both of the bracket sections 226 and 224, and threadingly engages a nut or other threaded member on one side of the bracket section 224 (or of the bracket section 226). In other examples, other suitable fasteners may be employed for selectively fastening the bracket sections 224 and 226 together, with the flange or lip 18d between the bracket sections 224 and 226.

In the illustrated example, each of the second bracket sections 226 of the sidewall mounting bracket 222 includes an upper lip 226a and a lower lip 226b. In particular examples, the lower lip 226b extends outward a greater distance than the upper lip 226a. In some examples, the difference in distance of extension of the lips 226a and 226b is approximately equal to the thickness of the flange or lip 18d. When the sidewall mounting bracket 222 is installed on a flange or lip 18d of a sidewall 18a of a vehicle bed (as shown in FIGS. 10 and 11), the upper lip 226a extends outward toward and contacts a surface of the flange or lip 18d of the sidewall 18a of the vehicle bed, and the lower lip 226b extends outward toward and contacts the rear surface of the first bracket section 224. In that arrangement, the fasteners 228 may be tightened to secure the first and second bracket sections 224 and 226 in a fixed position along the flange or lip 18d of the sidewall 18a of the vehicle bed.

Container Brackets

The container brackets 26 and 28 may have any suitable configuration for connecting to the arms 12 and 14. The illustrated examples show one example, with reference to the container bracket 26. The container bracket 28 may have a similar configuration or a different configuration. In the illustrated examples, the container brackets 26 and 28 have an identical configuration such that details described and shown for container bracket 26 also apply to the container bracket 28.

In the illustrated examples, the container bracket 26 includes a back section 26c from which the flanges 26a and 26b extend. In certain examples, a rear wall 26d is provided adjacent the back section 26c (or the back section 26c forms a bend or U-shape to provide rear wall 26d), to enforce the strength of the container bracket 26. In such examples, a portion of a side wall of the container 16 may be arranged between the back section 26c and the rear wall 26d, to strengthen the attachment of the container bracket 26 to the side wall of the container 16. In particular examples, the container bracket 26 is formed as a single, unitary structure. In other examples, the rear wall 26d is formed as a separate part relative to the back section 26c and flanges 26a and 26b.

In certain examples, the container bracket 26 may include one or more features to lock the second section 34 of the arm body 30 to the container bracket 26, when the pin 60 is inserted through the flanges 26a, 26b, 34a and 34b. In certain examples, the lock feature includes an extended portion of one or both of the flanges 26a and 26b, where the extended portion includes an aperture 26e that aligns with the opening in the loop 62a on the cotter pin 62, and receives a padlock or other suitable locking device to lock the cotter pin 62 (and, thus, to lock the pin 60) in its inserted state.

In certain examples, one or more (or a plurality of) fasteners 64 couple the container bracket 26 to the side wall of the container 16. In some examples, the fasteners may be threaded bolts that extend though openings in the back section 26c and rear wall 26d. In some examples, the threaded bolts may threadingly engage with threaded openings in the rear wall 26d. In other examples, other suitable fasteners may be employed with or in place of fasteners 64 including, but not limited to rivets, screws, adhesives, combinations thereof, or the like.

Figure 13:
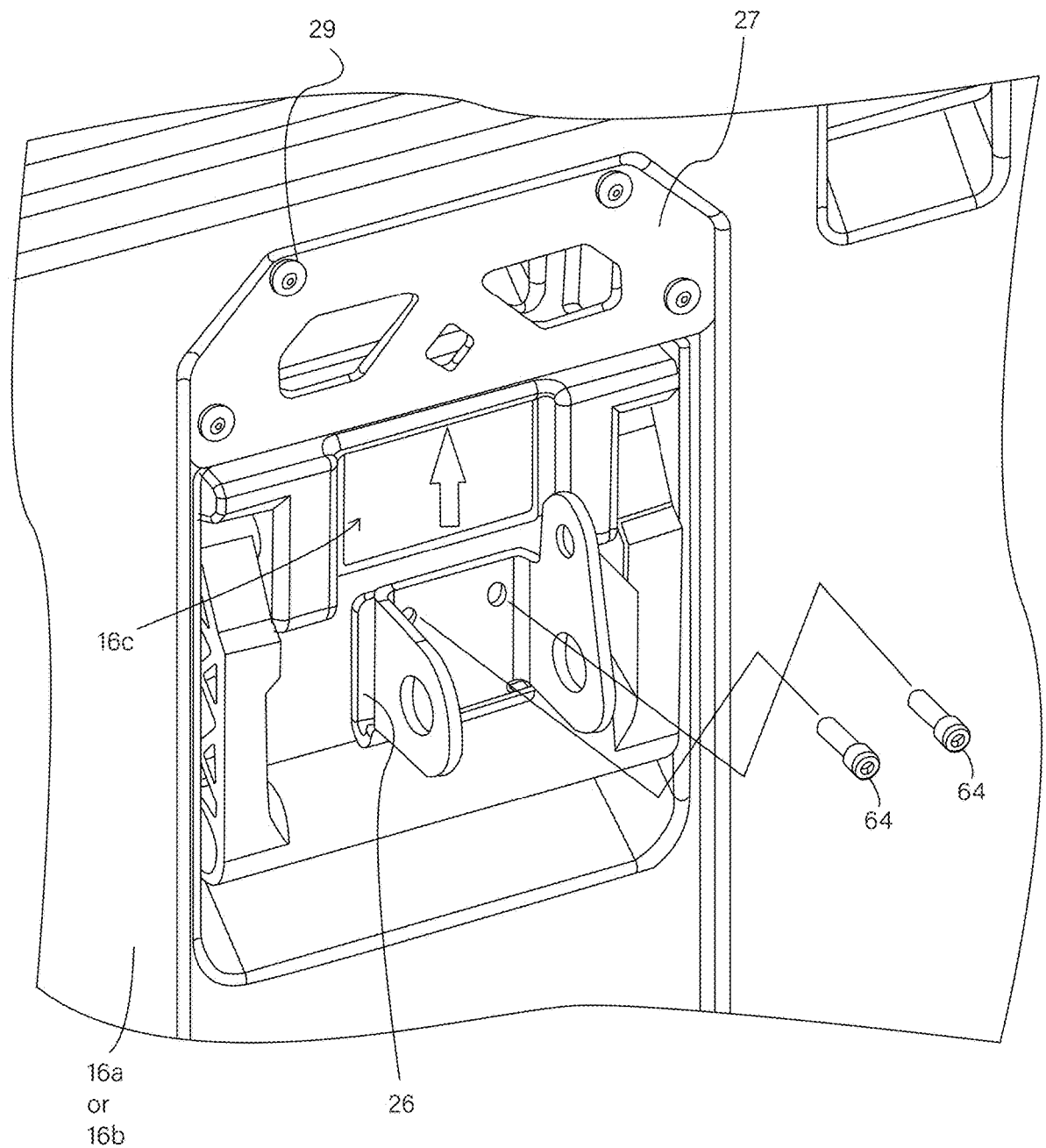
FIG. 13 is a perspective view of a container bracket being secured to a container, according to an exemplary embodiment.
Figure 14:
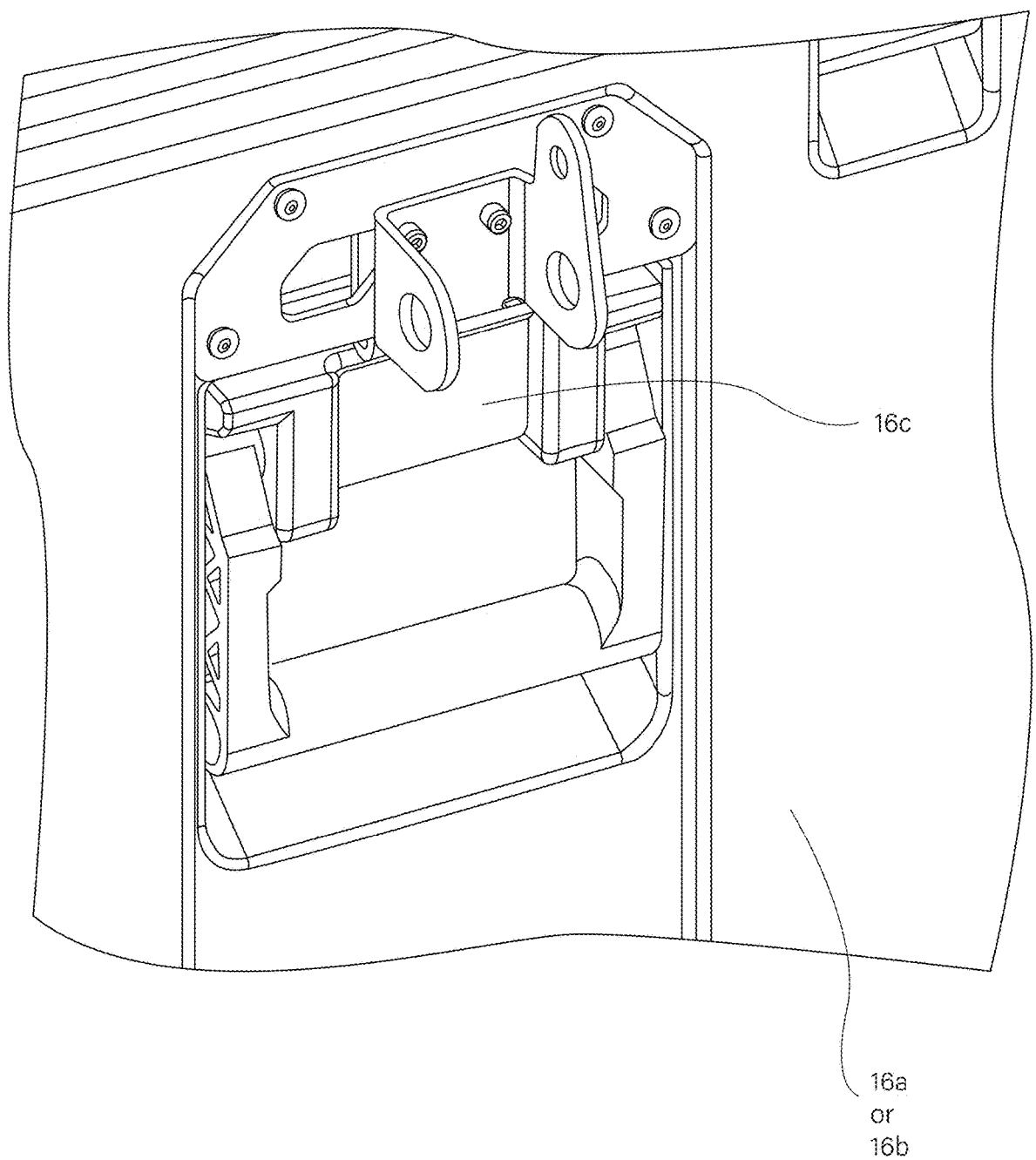
FIG. 14 is a perspective view of the container bracket of FIG. 13 after it is secured to the container.

In certain examples, as shown in FIGS. 13 and 14, the container bracket 26 includes or operates with a further bracket 27 that is connected to the side wall 16a of the container 16 by suitable fasteners 29 (permanent or removable fasteners), such as, but not limited to rivets, bolts, screws, adhesives, combinations thereof, or the like. Similarly, the container bracket 28 includes or operates with a further bracket (similar to the further bracket 27) that is connected to the side wall 16b of the container 16 by suitable fasteners (similar to fasteners 29).

The further bracket 27 connects to the side wall of the container 16, over and adjacent to a recessed region 16c on the side wall of the container, as shown in FIGS. 13 and 14. After the further bracket 27 is connected to the side wall 16a or 16b of the container 16, the container bracket 26 may be connected to the further bracket 27 by any suitable manner. In certain examples, the container bracket 26 connects to the further bracket 27, by positioning the container bracket 26 at least partially in the recessed region 16c and adjacent (such as below) the further bracket 27, as shown in FIGS. 13 and 14, and then slid toward the container bracket 26 (e.g., upward, in the direction of arrow 31), to receive a portion of the further bracket 27 between the back section 26c and the rear wall 26d of the container bracket 26. With the further bracket 27 received within the gap between the back section 26c and the rear wall 26d of the container bracket 26 as shown in FIGS. 13 and 14, the container bracket fasteners 64 may be tightened to secure the container bracket 26 to the further bracket 27 (and, thus, to the side wall 16a or 16b of the container 16). In certain examples, the further bracket 27 includes one or more apertures through which the container bracket fasteners 64 extend, when securing the container bracket 26 to the further bracket 27.

The container bracket fasteners 64 may be sufficiently engaged or tightened to secure the container bracket 26 to the further bracket 27. The container bracket 28 may be connected to the further bracket on the side wall 16b of the container 16 in a similar manner. In other examples, the container bracket 26 may be secured to the container 16 in other suitable manners, and with other suitable fastener configurations. In yet other examples, the container bracket 26 (or 28, or both) is secured to the container 16 during manufacture of the container 16, for example, by molding, forming or machining the container bracket 26 into the side wall (or other suitable location) on the container 16.

The arm body 30, including first and second sections 30 and 32, may be formed of any suitable material or materials (such as, but not limited to metal, plastic, wood, composite material, combinations thereof, or the like) and by any suitable manufacturing process or processes (including, but not limited to molding, machining, casting, cutting, combinations thereof, or the like). The sidewall mounting bracket 22 (or 122 or 222) may be formed of any suitable material or materials (such as, but not limited to metal, plastic, wood, composite material, combinations thereof, or the like) and by any suitable manufacturing process or processes (including, but not limited to molding, machining, casting, cutting, combinations thereof, or the like). The container brackets 26 and 28 may be formed of any suitable material or materials (such as, but not limited to metal, plastic, wood, composite material, combinations thereof, or the like) and by any suitable manufacturing process or processes (including, but not limited to molding, machining, casting, cutting, combinations thereof, or the like).

Installation Method

Example embodiments of a mounting system as described herein may be installed in a vehicle bed or other installation location in any suitable manner. In certain examples, a method of installation includes mounting a suitable first sidewall mounting bracket (for example, but not limited to sidewall mounting bracket 22, 122 or 222) on a first sidewall of a vehicle bed (or other installation location), and mounting a corresponding second sidewall mounting bracket on a second sidewall of a vehicle bed (or other installation location) facing opposite the first sidewall.

In addition, a first arm 12 is pivotally connected to the first sidewall mounting bracket, and a second arm 14 is pivotally connected to the second sidewall mounting bracket, through respective pivot joints. In certain examples, the first and second arms 12 and 14 are each connected to a respective one of the first and second sidewall mounting brackets, after the first sidewall mounting brackets are mounted on the sidewall of the vehicle bed (or other installation location). In other examples, the first and second arms 12 and 14 are each connected to a respective one of the first and second sidewall mounting brackets before the first sidewall mounting brackets are mounted on the sidewall of the vehicle bed (or other installation location), and the arms and sidewall mounting brackets are mounted to the sidewalls, together.

In certain examples, the arms 12 and 14 connect to the first and second sidewall mounting brackets through pivot joints 32a and 32b described herein. For example, the flanges 50a and 50b may be pivotally connected to the flanges 22a and 22b, with fasteners 56 and 58 as described above, or by other suitable connection configurations. In certain examples, to connect the arm 12 to the sidewall mounting bracket 22 (or 122 or 222), both of the flanges 50a and 50b fit between the flanges 22a and 22b, to align the fastener apertures in all of those flanges along the axis $A_1$. In other examples, the flanges 22a and 22b fit between the flanges 50a and 50b, to align the fastener apertures in all of those flanges along the axis $A_1$. In yet other examples, one of the flanges 50a or 50b may be positioned on the outside of the gap between the flanges 22a and 22b, while the other one of the flanges 50a and 50b may be positioned on the inside (in the gap between) the flanges 22a and 22b. When the openings in the flanges 22a, 22b, 50a and 50b are aligned, the fasteners 56 and 58 may be inserted through the openings in the flanges, to connect the arm 12 to the sidewall mounting bracket 22 (or 122 or 222). The second arm 14 may be pivotally connected to the sidewall mounting bracket 24 (or a bracket corresponding to sidewall mounting bracket 122 or 222), in a similar manner.

In particular examples, the first and second arms 12 and 14 pivotally connect to the first and second sidewall mounting brackets and, thus, are pivotal relative to the first and second sidewalls of the vehicle bed (or other installation location), when the first and second sidewall mounting brackets are mounted to the first and second sidewalls. In such examples, the length of each of the first and second arms 12 and 14 may be adjusted to be sufficiently small in length to allow the arm to pivot downward and hang adjacent or against the respective sidewall to which it is mounted.

To connect a container 16 to the first and second arms 12 and 14 of the mounting system, the container 16 may be placed in the vehicle bed (or other installation location), for example, by setting the container 16 on the horizontal surface of the bed at a location that is generally centered between the first and second arms 12 and 14. Then, the first and second arms 12 and 14 may be pivotally moved upward and adjusted in length to engage the container brackets 26 and 28, respectively, on two sides of the container 16. When engaged, the flanges 34a and 34b on the arm 12 fit between the flanges 26a and 26b on the container bracket 26, and the pin apertures in those flanges are aligned along the axis $A_2$ shown in FIG. 5. In other examples, the flanges 34a and 34b may be separated by a distance wider than the separation between flanges 26a and 26b, such that the flanges 26a and 26b fit between the flanges 34a and 34b, to align the pin apertures in all of those flanges along the axis $A_2$. In yet other examples, one of the flanges 34a or 34b may be positioned on the outside of the gap between the flanges 26a and 26b, while the other one of the flanges 34a and 34b may be positioned on the inside (in the gap between) the flanges 26a and 26b.

Once the openings in the flanges 26a, 26b, 34a and 34b are aligned, the pin 60 is inserted through the aligned pin apertures in the flanges 26a, 26b, 34a and 34b, and the cotter pin 62 is inserted into the cotter pin hole 60a of the pin 60, to connect the arm 12 to the container bracket 26 on one side of the container 16. In a similar manner, the arm 14 may be connected to the container bracket 28 on the opposite side of the container 16.

In certain examples, after the cotter pin 62 is inserted into the cotter pin hole 60a of the pin 60, the center opening of the loop 62a on the cotter pin can be manually aligned with the opening 26e on the extended portion of the flange 26a of the container bracket 26. Then, a shaft of a padlock or other locking mechanism may be inserted through the aligned opening 26e in the flange 26a and the center opening of the loop 62a of the cotter pin 62. The padlock or other locking mechanism can be set in a locked state, to lock the cotter pin 62 in place in the pin 60 (and inhibit removal of the pin 60 from the flanges 26a, 26b, 34a and 34b of the container bracket 26 and the arm 12). When locked, the padlock or other locking mechanism selectively locks one side of the container 16 to the arm 12, and inhibits removal of the container 16 from the vehicle bed 18 (or other installation location). In certain examples, a second padlock or other locking mechanism may be employed to selectively lock the other side of the container to the arm 14, such that two opposite sides of the container 16 may be locked to the arms 12 and 14, respectively. In other examples, only one container bracket 26 or 28 on one side of the container 16 is provided with an extended flange having a lock opening (corresponding to opening 26e) for receiving a padlock or other locking mechanism.

When installed in the vehicle bed 18 (or other installation location), the mounting system 10 supports the container 16 in the vehicle bed. In particular examples, the arms 12 and 14, when connected to opposite side walls of the container 16 and locked or set at an adjusted length dimension, inhibit movement of the container 16 within the vehicle bed 18. In particular examples, the arms 12 and 14 function together, to inhibit movement of the container 16 in a lateral direction, forward or rearward directions (or combinations thereof) of the vehicle bed 18, or in an upward direction (lifting off) of the vehicle bed.

While in an installed state, the container 16 may be inhibited from moving within the vehicle bed (or other installation location), for example, during traveling movement of the vehicle. In addition, when locked with a padlock or other locking mechanism, the container 16 may be inhibited from being stolen or otherwise removed from the vehicle bed (or other installation location).

From an installed state, the container 16 may be selectively unlocked and disconnected or removed from the vehicle bed (or other installation location). For example, a user may unlock the padlock or other locking mechanisms on each arm 12 or 14 that has a padlock or other locking mechanism. Then the user may remove the cotter pin 62 from the pin 60, for example, by gripping the loop end 62a of the cotter pin 62 and pulling the cotter pin 62 away from the pin 60. Then, the user may remove the pin 60 from the aligned openings in the flanges 26a, 26b, 34a and 34b, for example, by gripping the loop end 60b of the pin 60 and pulling the pin 60 away from the arm 12, along the direction of the axis $A_2$. Once the pin 60 is removed from the flanges 26a, 26b, 34a and 34b, the arm 12 may be pivoted away from the container bracket 26, to disconnect the container 16 from the arm 12. The arm 14 may be disconnected from the container bracket 28 in a similar manner. When the arms 12 and 14 are disconnected from the container brackets 26 and 28, respectively, the container 16 may be slid or lifted (or both) on or from the vehicle bed (or other installation location), for example to remove the container 16 from the vehicle bed (or other installation location). In addition, the arms 12 and 14 may remain connected to the sidewalls 18a and 18b of the vehicle bed 18 (or other installation location), and may be pivoted downward, for example to hang adjacent or against the sidewalls 18a and 18b, when the container 16 is disconnected or removed. In other examples, other suitable methods for installing or removing the container mounting system 10 and/or the container 16 from the vehicle bed 18 (or other installation location) may be employed.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the container as shown in the various exemplary embodiments is illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

Additionally, any element disclosed in one embodiment may be incorporated or utilized with any other embodiment disclosed herein. For example, in other embodiments, one or more pins corresponding to the pin 60, may be employed to connect flanges of the pivot joint 12, where the arm 12 connects to the sidewall bracket 22 (or other bracket 122 or 222), and similar pins may be employed to connect the arm 14 to the sidewall bracket 24. Where one example of an element from one embodiment that can be incorporated or utilized in another embodiment described above, it should be appreciated that various features of different embodiments may be incorporated or utilized together with any of the other embodiments disclosed herein.

What is claimed is:

1. A mounting system for securing a container to a bed of a vehicle or other installation location, the mounting system comprising:
    a first arm configured to couple a first side of the container to a first sidewall of the bed;
    a second arm configured to couple a second side of the container to a second sidewall of the bed, the second sidewall of the bed facing the first sidewall of the bed;

wherein each arm comprises:
an arm body having a length dimension, the arm body of at least one of the arms being adjustable in the length dimension;
a first joint for pivotally attaching a first end of the arm body for pivotal movement relative to one of the first or the second sidewalls of the bed;
a second joint for attaching a second end of the arm body for pivotal movement relative to one of the first or the second sides of the container;
wherein each arm is pivotally moveable relative to a respective one of a first and second sidewalls of the bed when the arm is attached to the respective one of the first sidewall or the second sidewall of the bed through the first joint and is not attached to the container at the second joint;
wherein the arm body of each arm is adjustable in its length dimension to a length that inhibits pivotal motion of each arm when the first end of each arm is pivotally attached relative to a respective one of the first sidewall and the second sidewall of the bed at the first joint and the second end of each arm is attached to the container at the second joint; and
wherein the arm body of each arm comprises a plurality of sections that are arranged adjacent to each other and slidable relative to each other in the length dimension of the arm body, to adjust the length dimension of the arm body.

2. The mounting system of claim 1, further comprising the container, a first container bracket on a first side of the container, and a second container bracket on a second side of the container, and at least one connector for selectively connecting the first container bracket to the first arm.

3. The mounting system of claim 1, further comprising a second connector for selectively connecting the second container bracket to the second arm.

4. The mounting system of claim 1, further comprising the container, a first container bracket on a first side of the container, and a second container bracket on a second side of the container, wherein the second joint of the first arm is configured to couple to the first container bracket, and wherein the second joint of the second arm is configured to couple to the second container bracket.

5. The mounting system of claim 4, wherein the second joint of the first arm is configured to pivotally couple to the first container bracket, and wherein the second joint of the second arm is configured to pivotally couple to the second container bracket.

6. A mounting system for securing a container to a bed of a vehicle or other installation location, the mounting system comprising:
the container;
a first arm configured to couple a first side of the container to a first sidewall of the bed;
a second arm configured to couple a second side of the container to a second sidewall of the bed, the second sidewall of the bed facing the first sidewall of the bed;
wherein each arm comprises:
an arm body having a length dimension, the arm body of at least one of the arms being adjustable in the length dimension;
a first joint for pivotally attaching a first end of the arm body for pivotal movement relative to one of the first or the second sidewalls of the bed; and
a second joint for attaching a second end of the arm body for pivotal movement relative to one of the first or the second sides of the container;
the attachment system further comprising a first container bracket on a first side of the container, and a second container bracket on a second side of the container, wherein the second joint of the first arm is configured to couple to the first container bracket, and wherein the second joint of the second arm is configured to couple to the second container bracket;
wherein each arm is pivotally moveable relative to a respective one of a first and second sidewalls of the bed when the arm is attached to the respective one of the first sidewall or the second sidewall of the bed through the first joint and is not attached to the container at the second joint;
wherein the arm body of each arm is adjustable in its length dimension to a length that inhibits pivotal motion of each arm when the first end of each arm is pivotally attached relative to a respective one of the first sidewall and the second sidewall of the bed at the first joint and the second end of each arm is attached to the container at the second joint;
wherein the second joint of the first arm is configured to pivotally couple to the first container bracket, and the second joint of the second arm is configured to pivotally couple to the second container bracket; and
wherein the first container bracket and the second container bracket each comprises a first pair of flanges, wherein each of the first arm and the second arm has a second pair of flanges, wherein each flange of the first pair of flanges and each flange of the second pair of flanges has an aperture, and wherein the second joint of each of the first and the second arms comprises a pin that extends through the apertures in each of the flanges of the first pair of flanges and each of the flanges of the second pair of flanges to connect the first and second arms to the first and second brackets, respectively, and wherein the pin is manually removable from the apertures in each of the flanges of the first pair of flanges and each of the flanges of the second pair of flanges to disconnect the first and second arms from the first and second container brackets.

7. The mounting system of claim 6, wherein the apertures in each of the flanges of the first pair of flanges align with the apertures in each of the flanges of the second pair of flanges to receive the pin.

8. The mounting system of claim 7, further comprising a cotter pin, wherein the pin includes an aperture for receiving the cotter pin, when the pin is extended through the apertures in the flanges of the first pair of flanges and the flanges of the second pair of flanges, to inhibit removal of the pin from the flanges of the first pair of flanges and the flanges of the second pair of flanges.

9. The mounting system of claim 8, wherein at least one of the flanges of the first pair of flanges of each container bracket has a lock aperture for receiving a locking mechanism, wherein the cotter pin includes a loop portion defining a central opening, and wherein the central opening of the cotter pin is configured to align with the lock aperture to receive the locking mechanism through the central opening and the lock aperture, when the cotter pin is received in the aperture of the pin.

10. The mounting system of claim 1, further comprising a first sidewall mounting bracket for mounting to the first sidewall of the bed, a second sidewall mounting bracket for mounting to a second sidewall of the bed, wherein the first joint pivotally attaches the first end of the first arm body to the first sidewall mounting bracket for pivotal movement relative to the first sidewall of the bed when the first sidewall mounting bracket is mounted to the first sidewall of the bed, and wherein the second joint pivotally attaches the first end of the second arm body to the second sidewall mounting bracket for pivotal movement relative to the second sidewall of the bed when the first sidewall mounting bracket is mounted to the second sidewall of the bed.

11. The mounting system of claim 10, wherein the first end of the first arm body is wider in a width dimension than the second end of the first arm body, wherein the first joint of the first arm includes first and second joint portion on respectively opposite sides of the width dimension of the first end of the first arm body.

12. The mounting system of claim 11, wherein the first end of the second arm body is wider in a width dimension than the second end of the second arm body, wherein the first joint of the second arm includes first and second joint portion on respectively opposite sides of the width dimension of the first end of the second arm body.

13. The mounting system of claim 6, wherein the arm body of each arm comprises a plurality of sections that are arranged adjacent to each other and slidable relative to each other in the length dimension of the arm body, to adjust the length dimension of the arm body.

14. The mounting system of claim 13, further comprising at least one fastener that connects the plurality of sections of the arm body together for sliding motion.

15. A mounting system for securing a container to a bed of a vehicle or other installation location, the mounting system comprising:
  a first arm configured to couple a first side of the container to a first sidewall of the bed;
  a second arm configured to couple a second side of the container to a second sidewall of the bed, the second sidewall of the bed facing the first sidewall of the bed;
  wherein each arm comprises:
    an arm body having a length dimension, the arm body of at least one of the arms being adjustable in the length dimension;
    a first joint for pivotally attaching a first end of the arm body for pivotal movement relative to one of the first or the second sidewalls of the bed;
    a second joint for attaching a second end of the arm body for pivotal movement relative to one of the first or the second sides of the container;
  wherein each arm is pivotally moveable relative to a respective one of a first and second sidewalls of the bed when the arm is attached to the respective one of the first sidewall or the second sidewall of the bed through the first joint and is not attached to the container at the second joint;
  wherein the arm body of each arm is adjustable in its length dimension to a length that inhibits pivotal motion of each arm when the first end of each arm is pivotally attached relative to a respective one of the first sidewall and the second sidewall of the bed at the first joint and the second end of each arm is attached to the container at the second joint;
  wherein the arm body of each arm comprises a plurality of sections that are arranged adjacent to each other and slidable relative to each other in the length dimension of the arm body, to adjust the length dimension of the arm body;
  wherein the mounting system further comprises at least one fastener that connects the plurality of sections of the arm body together for sliding motion; and
  wherein the plurality of sections of the arm body include a first section having a first aperture through which the at least one fastener extends, and a second section having an elongated aperture having a length dimension extending along at least a portion of the length dimension of the arm body and through which the at least one fastener extends, the at least one fastener being configured to be selectively loosened to allow the plurality of sections of the arm body to slide relative to each other while the at least one fastener moves along the length dimension of the elongated aperture to adjust the length of the arm body, and to be selectively tightened to lock or fix the length of the arm body.

16. A mounting system for securing a container to a bed of a vehicle or other installation location, the system comprising:
  the container;
  a sidewall mounting bracket for mounting to a first sidewall of the bed;
  an arm body having a length dimension, the arm body being adjustable in the length dimension;
  a first joint pivotally attaching a first end of the arm body to the sidewall mounting bracket for pivotal movement relative to the first sidewall of the bed when the sidewall mounting bracket is mounted to the first sidewall of the bed; and
  a second joint for attaching a second end of the arm body to the container;
  a second sidewall mounting bracket for mounting to a second sidewall of the bed; a second arm body having a length dimension, the second arm body being adjustable in the length dimension; another first joint pivotally attaching a first end of the second arm body to the second sidewall mounting bracket for pivotal movement relative to the second sidewall of the bed when the second sidewall mounting bracket is mounted to the second sidewall of the bed; and a further second joint for attaching a second end of the second arm body to the container; and
  a first container bracket on a first side of the container, and a second container bracket on the second side of the container, wherein the second joint of the first arm is configured to couple to the first container bracket, and wherein the second joint of the second arm is configured to couple to the second container bracket;
  wherein the first container bracket and the second container bracket each comprises a first pair of flanges, wherein each of the first arm body and the second arm body has a second pair of flanges, wherein each flange of the first pair of flanges and each flange of the second pair of flanges has an aperture, and wherein each of the second joints comprises a pin that extends through the apertures in each of the flanges of the first pair of flanges and each of the flanges of the second pair of flanges to connect the first and second arms to the first and second brackets, respectively; and wherein the pin is manually removable from the apertures in each of the flanges of the first pair of flanges and each of the flanges of the second pair of flanges to disconnect the first and second arms from the first and second container brackets.

17. The mounting system of claim 16, further comprising the container and a container bracket for selectively attaching to the arm body through the second joint.

18. The mounting system of claim 1, further comprising at least one fastener that connects the plurality of sections of the arm body together for sliding motion.

19. The mounting system of claim 1, wherein each arm further comprising at least one fastener that selectively fixes the plurality of sections of the arm body together and inhibits further sliding motion between the plurality of sections of the arm, once the plurality of sections are slid relative to each other to a desired adjusted position.

\* \* \* \* \*